(12) United States Patent
Zhang et al.

(10) Patent No.: US 7,492,559 B2
(45) Date of Patent: Feb. 17, 2009

(54) INTELLIGENT LIFE TESTING METHODS AND APPARATUS FOR LEAKAGE CURRENT PROTECTION

(75) Inventors: Feng Zhang, Shanghai (CN); Hongliang Chen, Shanghai (CN); Fu Wang, Yueqing Zhejiang (CN); Wusheng Chen, Yueqing Zhejiang (CN); Yulin Zhang, Shanghai (CN); Huaiyin Song, Yueqing Zhejiang (CN)

(73) Assignee: General Protech Group, Inc., Zhejiang (CN)

( * ) Notice: Subject to any disclaimer, the term of this patent is extended or adjusted under 35 U.S.C. 154(b) by 315 days.

(21) Appl. No.: 11/588,163

(22) Filed: Oct. 26, 2006

(65) Prior Publication Data

US 2007/0146947 A1 Jun. 28, 2007

(30) Foreign Application Priority Data

Dec. 27, 2005 (CN) .......................... 2005 1 0132842

(51) Int. Cl.
*H02H 9/08* (2006.01)
(52) U.S. Cl. .................... 361/42; 324/508; 324/509; 324/511; 324/537
(58) Field of Classification Search ............. 361/42–50; 324/508–509, 511, 537
See application file for complete search history.

(56) References Cited

U.S. PATENT DOCUMENTS

| | | | |
|---|---|---|---|
| 3,953,766 A * | 4/1976 | Howell et al. .................. 361/45 |
| 4,931,894 A | 6/1990 | Legatti |
| 4,979,070 A | 12/1990 | Bodkin |
| 5,053,931 A | 10/1991 | Rushing |
| 5,223,810 A | 6/1993 | Van Haaren |
| 5,229,730 A | 7/1993 | Legatti et al. |
| 5,334,939 A | 8/1994 | Yarbrough |
| 5,363,269 A | 11/1994 | McDonald |
| 5,418,678 A | 5/1995 | McDonald |
| 5,448,443 A | 9/1995 | Muelleman |
| 5,477,412 A | 12/1995 | Neiger et al. |
| 5,541,800 A | 7/1996 | Misencik |
| 5,642,248 A | 6/1997 | Campolo et al. |
| 5,654,857 A | 8/1997 | Gershen |
| 5,661,623 A | 8/1997 | McDonald et al. |
| 5,673,360 A | 9/1997 | Scripps |
| 5,684,272 A | 11/1997 | Gernhardt et al. |
| 5,706,155 A | 1/1998 | Neiger et al. |

(Continued)

*Primary Examiner*—Stephen W Jackson
*Assistant Examiner*—Terrence R Willoughby
(74) *Attorney, Agent, or Firm*—Morris Manning Martin LLP; Tim Tingkang Xia

(57) ABSTRACT

An apparatus for testing the life of a leakage current protection device having a leakage current detection circuit and a trip mechanism having a switch device. In one embodiment, the apparatus a ground fault simulation unit, a fault detector of the leakage current detection circuit and the trip mechanism, and a life testing detection control unit having an MCU for controlling operation of the fault detector. In operation, a first signal (pulse signal) is sent to the gate of the switching device to generate a first voltage at the cathode of the switching device, a second signal is sent to the ground fault simulation unit to generate a simulated ground fault for the leakage current detection circuit to generate a second voltage at the gate of the switching device, and the first and second voltages are measured to determine whether a fault exists in the leakage current detection circuit and the trip mechanism.

20 Claims, 9 Drawing Sheets

U.S. PATENT DOCUMENTS

| Patent No. | Kind | Date | Inventor(s) | Ref |
|---|---|---|---|---|
| 5,729,417 | A | 3/1998 | Neiger et al. | |
| 5,757,598 | A | 5/1998 | Aromin | |
| 5,786,971 | A | 7/1998 | Chan et al. | |
| 5,825,599 | A | 10/1998 | Rosenbaum | |
| 5,841,615 | A | 11/1998 | Gershen | |
| 5,899,761 | A | 5/1999 | Crane et al. | |
| 5,906,517 | A | 5/1999 | Crane et al. | |
| 5,963,406 | A | 10/1999 | Neiger et al. | |
| 5,963,408 | A | 10/1999 | Neiger et al. | |
| 6,021,034 | A | 2/2000 | Chan et al. | |
| 6,040,967 | A | 3/2000 | DiSalvo | |
| 6,052,265 | A | 4/2000 | Zaretsky et al. | |
| 6,052,266 | A | 4/2000 | Aromin | |
| 6,128,169 | A | 10/2000 | Neiger et al. | |
| 6,226,161 | B1 | 5/2001 | Neiger et al. | |
| 6,246,558 | B1 | 6/2001 | DiSalvo et al. | |
| 6,252,407 | B1 | 6/2001 | Gershen | |
| 6,259,340 | B1 | 7/2001 | Fuhr et al. | |
| 6,262,871 | B1 | 7/2001 | Nemir et al. | |
| 6,282,070 | B1 | 8/2001 | Ziegler et al. | |
| 6,292,337 | B1 | 9/2001 | Legatti et al. | |
| 6,339,525 | B1 | 1/2002 | Neiger et al. | |
| 6,381,112 | B1 | 4/2002 | DiSalvo | |
| 6,381,113 | B1 | 4/2002 | Legatti | |
| 6,407,469 | B1 | 6/2002 | Cline et al. | |
| 6,407,893 | B1 | 6/2002 | Neiger et al. | |
| 6,433,555 | B1 | 8/2002 | Leopold et al. | |
| 6,437,700 | B1 | 8/2002 | Herzfeld et al. | |
| 6,437,953 | B2 | 8/2002 | DiSalvo et al. | |
| 6,437,955 | B1 | 8/2002 | Duffy et al. | |
| 6,442,007 | B1 | 8/2002 | Li | |
| 6,465,735 | B2 | 10/2002 | May | |
| 6,515,564 | B2 | 2/2003 | Leopold et al. | |
| 6,532,139 | B2 | 3/2003 | Kim et al. | |
| 6,538,862 | B1 | 3/2003 | Mason, Jr. et al. | |
| 6,540,533 | B1 | 4/2003 | Schreiber | |
| 6,577,478 | B2 | 6/2003 | Kim et al. | |
| 6,611,406 | B2 | 8/2003 | Neiger et al. | |
| 6,643,108 | B2 | 11/2003 | Cline et al. | |
| 6,646,838 | B2 | 11/2003 | Ziegler et al. | |
| 6,657,834 | B2 | 12/2003 | DiSalvo | |
| 6,671,145 | B2 | 12/2003 | Germain et al. | |
| 6,674,289 | B2 * | 1/2004 | Macbeth | 324/509 |
| 6,697,238 | B2 | 2/2004 | Bonilla et al. | |
| 6,724,589 | B1 | 4/2004 | Funderburk | |
| 6,734,680 | B1 | 5/2004 | Conard | |
| 6,734,769 | B1 | 5/2004 | Germain et al. | |
| 6,747,367 | B2 | 6/2004 | Cline et al. | |
| 6,771,152 | B2 | 8/2004 | Germain et al. | |
| 6,788,504 | B2 | 9/2004 | Vanderkolk | |
| 6,813,126 | B2 | 11/2004 | DiSalvo et al. | |
| 6,828,886 | B2 | 12/2004 | Germain et al. | |
| 6,850,394 | B2 | 2/2005 | Kim | |
| 6,859,044 | B2 | 2/2005 | Hughes | |
| 6,864,766 | B2 | 3/2005 | DiSalvo et al. | |
| 6,867,954 | B2 | 3/2005 | Wu et al. | |
| 6,873,231 | B2 | 3/2005 | Germain et al. | |
| 6,897,381 | B2 | 5/2005 | He et al. | |
| 6,915,992 | B1 | 7/2005 | Gretz | |
| 6,944,001 | B2 | 9/2005 | Ziegler et al. | |
| 6,946,935 | B2 | 9/2005 | Wu et al. | |
| 6,949,994 | B2 | 9/2005 | Germain et al. | |
| 6,949,995 | B2 | 9/2005 | Leopold et al. | |
| 6,954,125 | B2 | 10/2005 | Wu et al. | |
| 6,958,463 | B1 | 10/2005 | Kochman et al. | |
| 6,963,260 | B2 | 11/2005 | Germain et al. | |
| 6,972,572 | B2 | 12/2005 | Mernyk et al. | |
| 6,975,492 | B2 | 12/2005 | DiSalvo | |
| 6,982,856 | B2 | 1/2006 | Bernstein | |
| 6,991,495 | B1 | 1/2006 | Aromin | |
| 2004/0037018 | A1 * | 2/2004 | Kim | 361/42 |
| 2004/0070899 | A1 * | 4/2004 | Gershen et al. | 361/42 |
| 2006/0198066 | A1 | 9/2006 | Chen et al. | |

* cited by examiner

INTELLIGENT LIFE TESTING METHODS AND APPARATUS FOR LEAKAGE CURRENT PROTECTION

CROSS-REFERENCE TO RELATED APPLICATION

This application claims priority of Chinese Patent Application No. 2005 1013 2842.3, filed on Dec. 27, 2005, entitled "Intelligent Life Testing Methods and Apparatus for Leakage Current Protection" by Feng ZHANG, Hongliang CHEN, Fu WANG, Wusheng CHEN, Yulin ZHANG and Huaiyin SONG, the disclosure of which is incorporated herein by reference in its entirety.

This application is related to four co-pending U.S. patent applications, entitled "Intelligent Life Testing Methods and Apparatus for Leakage Current Protection Device with Indicating Means," by Feng ZHANG, Hongliang CHEN, Fu WANG, Wusheng CHEN, Yulin ZHANG and Huaiyin SONG, Ser. No. 11/588,017; "Apparatus and Methods for Testing the Life of a Leakage Current Protection Device," by Feng ZHANG, Hongliang CHEN, Fu WANG, Wusheng CHEN, Yulin ZHANG and Huaiyin SONG; Ser. No. 11/588,016; "Intelligent Life Testing Methods and Apparatus for Leakage Current Protection," by Wusheng CHEN, Fu WANG, and Lianyun WANG, Ser. No. 11/588,046; and "Intelligent Life Testing Methods and Apparatus for Leakage Current Protection," by Feng ZHANG, Hongliang CHEN, Fu WANG, Wusheng CHEN, Yulin ZHANG and Huaiyin SONG, Ser. No. 11/588,048, respectively. The above identified co-pending applications were filed on the same day that this application was filed, and with the same assignee as that of this application. The disclosures of the above identified co-pending applications are incorporated herein by reference in their entireties.

FIELD OF THE PRESENT INVENTION

The present invention generally relates to real time detection of fault with an alarming device of a leakage current protection device for appliances. More particularly, the present invention relates to intelligent life testing methods and apparatus for leakage current protection.

BACKGROUND OF THE PRESENT INVENTION

Leakage current protection can be divided into two categories according to their functionalities: ground fault circuit interrupter (hereinafter "GFCI") and arc fault circuit interrupter (hereinafter "AFCI"). In order to achieve the goal of leakage current protection, a leakage current protection device used for appliances comprises at least two components: a trip mechanism and a leakage current detection circuit. The trip mechanism comprises a silicon controlled rectifier (hereinafter "SCR"), trip coil, and trip circuit interrupter device. The leakage current detection circuit comprises induction coils, a signal amplifier and a controller.

The operating principle of a GFCI used for appliances is as follows. In a normal condition, the electric current on a hot wire of an electrical socket should be the same as the electric current on a neutral wire in the same electrical socket. When a leakage current occurs, there exists a current differential between the hot wire and the neutral wire of the electrical socket. The inductive coil of the leakage current protection device monitors the current differential and transfers the current differential into a voltage signal. The voltage signal is then amplified by the signal amplifier and sent to the controller. If the current differential exceeds a predetermined threshold, the controller sends a control signal to the trip circuit interrupter to cut off the connection between the AC power and the appliance to prevent damage caused by the leakage current.

For an AFCI used for appliances, in a normal condition, the electric current on a hot wire of an electrical socket should be the same as the electric current on a neutral wire in the same electrical socket, and the variation of both the electric current is same. When an arc fault occurs due to aging or damages of the AFCI device, the current or voltage between the hot wire and the neutral wire of the electrical socket exhibits a series of repeated pulse signals. The inductive coil of the arc fault protection device detects the pulse signals and converts the pulse signals to a voltage signal. The voltage signal is amplified by the signal amplifier and sent to the controller. If the amplitude of the pulse signals or the their occurring frequency exceed certain predetermined threshold, the controller sends a control signal to the trip circuit interrupter to cut off the connection between the AC power and the appliance to prevent further damage caused by the arc fault.

Leakage current protection devices have been widespreadly used because of their superior performance. However, the leakage protection devices may fail to provide such leakage current protection, if they are installed improperly and/or they are damaged due to aging. If a faulty controller can not output a correct control signal, or a trip mechanism fails to cut off the connection between the AC power and the appliance, the leakage current protection device will not be able to provide the leakage current protection, which may cause further damages or accidents. Although most leakage current protection devices are equipped with a manual testing button, usually, users seldom use the manual testing button. Therefore, the leakage current protection devices need an additional circuit to automatically detect malfunctions, faults or the end of the life of such devices. The great relevance would be gained if a leakage current protection device is capable of automatically detecting a fault therein or its end of the life, and consequently alerting a user to take an appropriate action including repairing or replacing the leakage current detection circuit.

Therefore, a heretofore unaddressed need exists in the art to address the aforementioned deficiencies and inadequacies.

SUMMARY OF THE PRESENT INVENTION

In one aspect, the present invention relates to an apparatus for testing the life of a leakage current protection device. The leakage current protection device has a first input, a second input, a third input, a fourth input, a first output, a second output, a third output, a trip switch having two LINE terminals that are electrically coupled to the first input and the second input, respectively, and two LOAD terminals that are electrically coupled to the inputs of an electrical appliance, respectively, a reset circuit having an input that is electrically coupled to the third input, and an output that is electrically coupled to the first output, a trip coil circuit having a switching device having a gate, an anode and a cathode, a first input electrically coupled to the output of the reset circuit and the first output, a second input $140a2$ that is electrically coupled to the fourth input, an output that is electrically coupled to the second output, and a leakage current detection circuit having an output that is electrically coupled to the third output of the leakage current protection device.

In one embodiment, the apparatus comprises a microcontroller unit (MCU) having a first input that is electrically coupled to the second output of the leakage current protection device, a second input, a third input that is electrically coupled to the output of the leakage current detection device and the third output of the leakage current protection device, a first output that is electrically coupled to the third input of the leakage current protection device, a second output, a third output, a fourth output that is electrically coupled to the second input of the trip coil circuit and the fourth input of the leakage current protection device, and a power supply input P.

The apparatus further comprises a power grid signal synchronization monitoring circuit having an input that is electrically coupled to the first output of the leakage current protection device, and an output that is electrically coupled to the second input of the MCU; an alarm circuit having an input that is electrically coupled to the third output of the MCU, and a power supply input; a power supply circuit having an input that is electrically coupled to the first output of the leakage current protection device, and an output that is electrically coupled to the power supply input P of the MCU and the power supply input of the alarm circuit; and a ground fault simulation unit having an input that is electrically coupled to the second output of the MCU, a first output that is electrically coupled to the first input of the leakage current protection device, a second output that is electrically coupled to the second input of the leakage current protection device.

In operation, the power grid signal synchronization monitoring circuit generates a first signal synchronized with an AC power from the first input and the second input of the leakage current protection device to form a power grid signal synchronization signal electrically coupled to the second input of the MCU; the MCU generates a pulse signal when the power grid signal synchronization signal reduces to a first predetermined threshold value during every positive half-wave of the AC power, and a second signal from the second output to the ground fault simulation unit to generate a simulated ground fault signal; the leakage current detection circuit generates a third signal in responsive to the simulated ground fault signal and the pulse signal, which is input into the third input of the MCU; the gate of the switching device receives the pulse signal to turn the switching device into its conductive state during the pulse period; and the MCU receives a DC voltage at the first input of the MCU, and compares the DC voltage with a second predetermined threshold value to determine whether a fault exists in the leakage current protection device, and activates the alarm circuit if the at least one fault exists.

In one embodiment, the MCU is programmed such that if the DC voltage is greater than the second predetermined threshold value, no fault exists in the leakage current protection device, and if the DC voltage is less than the second predetermined threshold value, at least one fault exists in the leakage current protection device. The apparatus provides a surge protection function. When the voltage at the first input and the second input of the leakage current protection device exceeds a third predetermined threshold value, the MCU sends a signal to a switching device to set the trip switch in a non-conductive state and to disconnect the AC power from the LINE terminals to the LOAD terminals of the trip switch. The switching device comprises a silicon controlled rectifier, when the switching device is in a conductive state, the switching device passes current in the positive half-wave of the AC power to set the trip switch in a non-conductive state and to disconnect the AC power from the LINE terminals to the LOAD terminals of the trip switch.

During the time period when the trip switch is in a non-conductive state, the apparatus continues to detect faults of the leakage current protection device. When the trip switch is in a non-conductive state for a predetermined timeout period, and the MCU does not detect any fault in the leakage current protection device, the MCU sends a signal to a reset switching device to set the trip switch in a conductive state and to connect the AC power from the LINE terminals to the LOAD terminals of the trip switch, where the length of the predetermined timeout period is adjustable. Therefore, the apparatus also provides an automatic reset function.

When the MCU determines that at least one fault exists, the MCU sends an alarm signal to the alarm circuit, and the alarm circuit receives the alarm signal and generates an alarm. In one embodiment, the alarm circuit comprises at least one of an audio alarm circuit for generating an audible alarm and a visual alarm circuit for generating a visible alarm.

In another aspect, the present invention relates to a method for intelligently testing the life of a leakage current protection device. The leakage current protection device has a first input, a second input, a third input, a fourth input, a first output, a second output, a third output, a trip switch having two LINE terminals that are electrically coupled to the first input and the second input, respectively, and two LOAD terminals that are electrically coupled to the inputs of an electrical appliance, respectively, a reset circuit having an input that is electrically coupled to the third input, and an output that is electrically coupled to the first output, a trip coil circuit having a switching device having a gate, an anode and a cathode, a first input electrically coupled to the output of the reset circuit and the first output, a second input $140a2$ that is electrically coupled to the fourth input, an output that is electrically coupled to the second output, and a leakage current detection circuit having an output that is electrically coupled to the third output of the leakage current protection device.

In one embodiment, the method includes the step of providing a testing device. The testing device in one embodiment has a microcontroller unit (MCU) having a first input that is electrically coupled to the second output of the leakage current protection device, a second input, a third input that is electrically coupled to the output of the leakage current detection device and the third output of the leakage current protection device, a first output that is electrically coupled to the third input of the leakage current protection device, a second output, a third output, a fourth output that is electrically coupled to the second input of the trip coil circuit and the fourth input of the leakage current protection device, and a power supply input P; a power grid signal synchronization monitoring circuit having an input that is electrically coupled to the first output of the leakage current protection device, and an output that is electrically coupled to the second input of the MCU; an alarm circuit having an input that is electrically coupled to the third output of the MCU, and a power supply input; a power supply circuit having an input that is electrically coupled to the first output of the leakage current protection device, and an output that is electrically coupled to the power supply input P of the MCU and the power supply input of the alarm circuit; and a ground fault simulation unit having an input that is electrically coupled to the second output of the MCU, a first output that is electrically coupled to the first input of the leakage current protection device, a second output that is electrically coupled to the second input of the leakage current protection device.

Furthermore, the method includes the steps of generating a power grid synchronization signal that is received at the second input of the MCU, by the power grid signal synchronization monitoring circuit; producing a pulse signal when the power grid signal synchronization signal reduces to a first predetermined threshold value and a second signal during every positive half-wave of the AC power by the MCU, wherein the pulse signal is output to the gate of the switching device, and wherein the second signal is output to the ground fault simulation unit so as to generate a simulated ground fault signal therein; and generating a third signal in responsive to the simulated ground fault signal, which is received at the third input of the MCU.

Moreover, the method includes the steps of received the pulse signal at the gate of the switching device to turn the switching device into a conductive state during the pulse period; detecting a DC voltage between the gate and the cathode of the switching device; and comparing the DC voltage to a second predetermined threshold value by the MCU to determine whether a fault exists in the leakage current protection device, wherein the MCU is programmed such that if the DC voltage is greater than the second predetermined threshold value, no fault exists in the leakage current protection device, and if the DC voltage is less than the second predetermined threshold value, a fault exists in the leakage current protection device.

Additionally, the method includes the steps of and activating the alarm circuit by the MCU if a fault exists in the leakage current protection device to generate an alarm to alert users of the leakage current protection device. In one embodiment, the activating the alarm circuit step further comprising at least of one of following steps activating an audio alarm circuit for generating an audible alarm; and activating a visual alarm circuit for generating a visible alarm.

In yet another aspect, the present invention relates to an apparatus with intelligent life testing. In one embodiment, the apparatus includes a leakage current protection device having a first input, a second input, a third input, a fourth input, a first output, a second output, a third output, a trip switch having two LINE terminals that are electrically coupled to the first input and the second input, respectively, and two LOAD terminals that are electrically coupled to the inputs of an electrical appliance, respectively, a reset circuit having an input that is electrically coupled to the third input, and an output that is electrically coupled to the first output, a trip coil circuit having a switching device having a gate, an anode and a cathode, a first input electrically coupled to the output of the reset circuit and the first output, a second input $140a2$ that is electrically coupled to the fourth input, an output that is electrically coupled to the second output, and a leakage current detection circuit having an output that is electrically coupled to the third output of the leakage current protection device.

The apparatus further includes a microcontroller unit (MCU) having a first input that is electrically coupled to the second output of the leakage current protection device, a second input, a third input that is electrically coupled to the output of the leakage current detection device and the third output of the leakage current protection device, a first output that is electrically coupled to the third input of the leakage current protection device, a second output, a third output, a fourth output that is electrically coupled to the second input of the trip coil circuit and the fourth input of the leakage current protection device, and a power supply input P; a power grid signal synchronization monitoring circuit having an input that is electrically coupled to the first output of the leakage current protection device, and an output that is electrically coupled to the second input of the MCU; an alarm circuit having an input that is electrically coupled to the third output of the MCU, and a power supply input; a power supply circuit having an input that is electrically coupled to the first output of the leakage current protection device, and an output that is electrically coupled to the power supply input P of the MCU and the power supply input of the alarm circuit; and a ground fault simulation unit having an input that is electrically coupled to the second output of the MCU, a first output that is electrically coupled to the first input of the leakage current protection device, a second output that is electrically coupled to the second input of the leakage current protection device.

In operation, the power grid signal synchronization monitoring circuit generates a first signal synchronized with an AC power from the first input and the second input of the leakage current protection device to form a power grid signal synchronization signal electrically coupled to the second input of the MCU; the MCU generates a pulse signal when the power grid signal synchronization signal reduces to a first predetermined threshold value during every positive half-wave of the AC power, and a second signal from the second output to the ground fault simulation unit to generate a simulated ground fault signal; the leakage current detection circuit generates a third signal in responsive to the simulated ground fault signal and the pulse signal, which is input into the third input of the MCU; the gate of the switching device receives the pulse signal to turn the switching device into its conductive state during the pulse period; and the MCU receives a DC voltage at the first input of the MCU, and compares the DC voltage with a second predetermined threshold value to determine whether a fault exists in the leakage current protection device, and activates the alarm circuit if the at least one fault exists.

In one embodiment, the MCU is programmed such that if the DC voltage is greater than the second predetermined threshold value, no fault exists in the leakage current protection device, and if the DC voltage is less than the second predetermined threshold value, at least one fault exists in the leakage current protection device. The apparatus provides a surge protection function. When the voltage at the first input and the second input of the leakage current protection device exceeds a third predetermined threshold value, the MCU sends a signal to a switching device to set the trip switch in a non-conductive state and to disconnect the AC power from the LINE terminals to the LOAD terminals of the trip switch. The switching device comprises a silicon controlled rectifier, when the switching device is in a conductive state, the switching device passes current in the positive half-wave of the AC power to set the trip switch in a non-conductive state and to disconnect the AC power from the LINE terminals to the LOAD terminals of the trip switch.

During the time period when the trip switch is in a non-conductive state, the apparatus continues to detect faults of the leakage current protection device. When the trip switch is in a non-conductive state for a predetermined timeout period, and the MCU does not detect any fault in the leakage current protection device, the MCU sends a signal to a reset switching device to set the trip switch in a conductive state and to connect the AC power from the LINE terminals to the LOAD terminals of the trip switch, where the length of the predetermined timeout period is adjustable. Therefore, the apparatus also provides an automatic reset function.

When the MCU determines that at least one fault exists, the MCU sends an alarm signal to the alarm circuit, and the alarm circuit receives the alarm signal and generates an alarm. In one embodiment, the alarm circuit comprises at least one of an audio alarm circuit for generating an audible alarm and a visual alarm circuit for generating a visible alarm.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE PRESENT INVENTION

Figure 1:
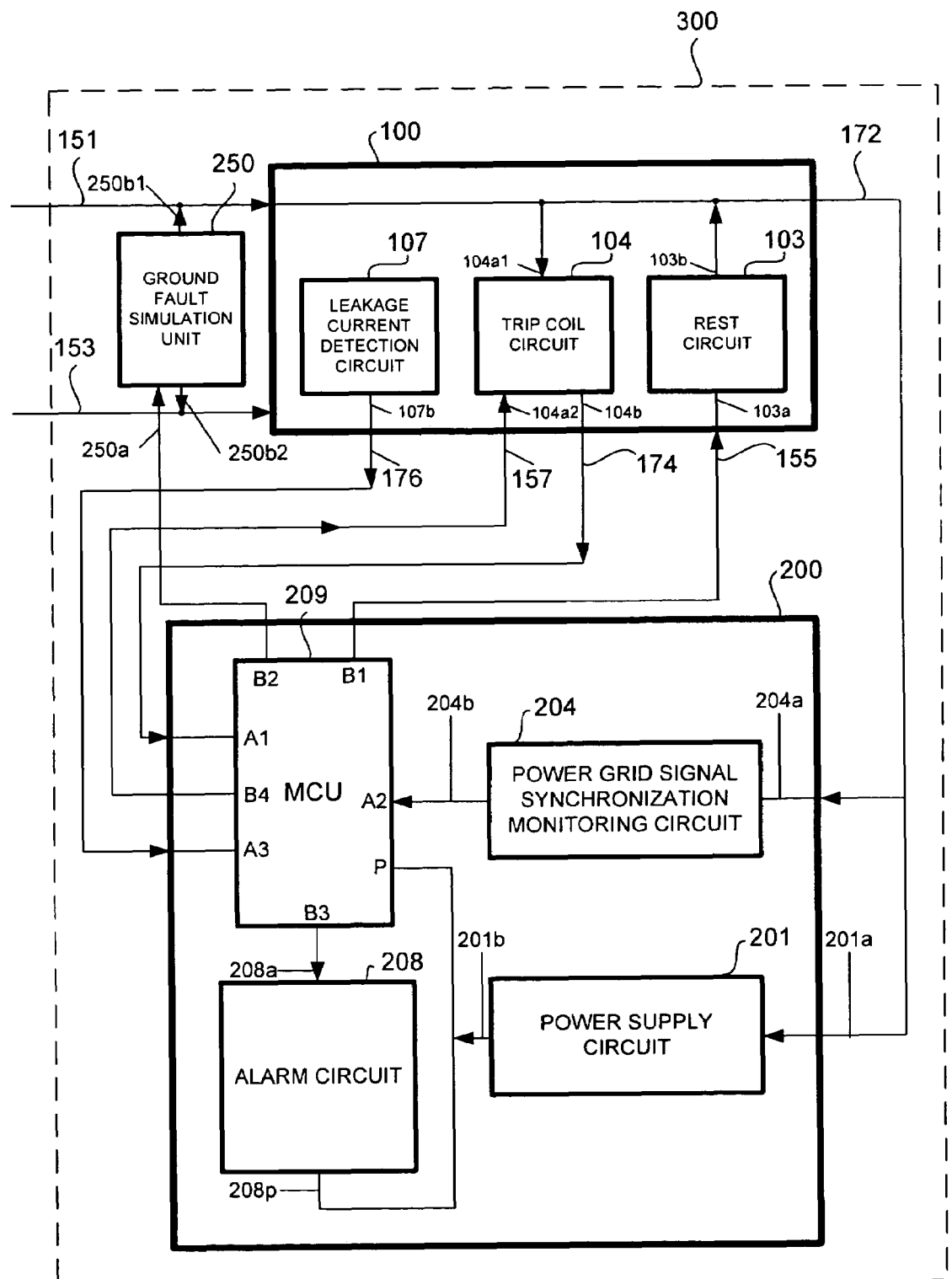
FIG. 1 shows a block diagram of an apparatus for intelligently testing the life of a leakage current protection device according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. Whether or not a term is capitalized is not considered definitive or limiting of the meaning of a term. As used in the description herein and throughout the claims that follow, a capitalized term shall have the same meaning as an uncapitalized term, unless the context of the usage specifically indicates that a more restrictive meaning for the capitalized term is intended. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "unit" and "circuit" are interchangeable, and refer to a configuration of electrically or electromagnetically electrically coupled components or devices.

The term "switch" or "switching device", refers to a device for changing the course (or flow) of a circuit, i.e., a device for making or breaking an electric circuit, or for selecting between multiple circuits. As used herein, a switch or switching device has two states: a conductive state and a non-conductive state. When the switching device is in the conductive state, a current is allowed to pass through. When the switching device is in the non-conductive state, no current is allowed to pass through.

As used herein, short names, acronyms and/or abbreviations "AC" refers to alternate current; "DC" refers to direct current; "AFCI" refers to arc fault circuit interrupter; "GFCI" refers to ground fault circuit interrupter; "LED" refers to light emitting diode; "MCU" refers to microcontroller unit; and "SCR" refers to silicon controlled rectifier.

Overview of the Invention

The present invention, among other things, discloses an apparatus and method for testing the life of a leakage current protection device. The leakage current protection device has a leakage current detection circuit and a trip mechanism having a switch device. The switch device has a gate, an anode and a cathode. The leakage current detection circuit of the leakage current protection device has two inductive coils adapted for detecting a leakage current. In one embodiment, the apparatus includes a ground fault simulation unit, a fault detector of the leakage current detection circuit and the trip mechanism, and a life testing detection control unit having a microcontroller unit (MCU) for controlling operation of the fault detector. In operation, a first signal (pulse signal) is sent to the gate of the switching device to generate a first voltage at the cathode of the switching device, a second signal is sent to the ground fault simulation unit to generate a simulated ground fault for the leakage current detection circuit to generate a second voltage at the gate of the switching device, and the first and second voltages are measured to determine whether a fault exists in the leakage current detection circuit and the trip mechanism. In other words, the apparatus of the present invention in operation detects a leakage current in the leakage current protection device, compares the leakage current with a predetermined threshold and consequently outputs a leakage current protection (and/or alarm) signal if a fault occurs and/or the life of leakage current protection device reaches its end. In this sense, the invented apparatus is an intelligently testing apparatus of the life of devices.

A silicon controlled rectifier (SCR) constitutes a key component of the trip mechanism of the leakage current protection device. In such a device, when a leakage current or arc fault occurs, the conduction of the current through the SCR must be guaranteed. Otherwise, the trip coil circuit is broken and the trip mechanism fails to operate properly.

It is experimentally showed that a proper operation of the trip mechanism depends not only on whether the trip coil conducts current, but also on the other conditions such as the current level and the duration of current conduction. The current level must be strong enough and the duration of current conduction must be long enough. Since the trip coil and the SCR are electrically coupled to a 110 to 240V AC power, the descending edge of the positive cycle of the AC power is selected to turn on the SCR when the instant value exceeds a pre-determined value. While the SCR is set in its conductive state, the leakage current detection circuit is tested to determine whether the current passes through the SCR. Immediately after the SCR is turned on, the AC power crosses zero volt level and enters the negative cycle, the SCR is turned off. Since the SCR is turned on only for a very brief moment, the current passing through the SCR is small enough to ensure the trip mechanism is not tripped.

In addition to a switching device (e.g. an SCR), the trip mechanism also includes a trip coil and a trip switch. The trip switch has to two pairs of terminals. One pair is corresponding to a pair of LINE terminals for connecting to an AC power source and the other pair is corresponding to a pair of LOAD terminals for connecting to one or more electrical appliances. When the trip switch is in the conductive state, the first LINE terminal is electrically coupled to the first LOAD terminal and the second LINE terminal is electrically coupled to the second LOAD terminal, respectively. When the trip switch is in the non-conductive state, the first and second LINE terminals are electrically decoupled from the first and second LOAD terminal, respectively. The trip switch is operated by the trip coil. When the trip coil is set in its conductive state, a current is allowed to pass through. When the trip switch is set in its non-conductive state, the AC power at the pair of LINE terminals is disconnected from the pair of LOAD terminals.

According to the present invention, the apparatus detects faults within the leakage current detection circuit for the leakage current protection device and the trip mechanism in the real time for testing the life of the leakage current protection device. In a descending edge of every positive half-wave of an AC power, or at a predetermined time, the apparatus sets the switching device SCR in its conductive state in a substantially short period of time, and tests whether the leakage current detection circuit for the leakage current protection device and the trip mechanism work properly. Shortly after the SCR is set in the conductive state, the voltage of the AC power crosses the zero line and thus sets the switching device SCR into its non-conductive state. The duration of the switching device SCR in the conductive state is so short such that the current passing through is not strong enough to activate the trip mechanism. If they are not working properly, at least one of an audio alarm circuit and a visual alarm circuit is activated. The present invention can be found many applications in different types of leakage current protection devices including GFCI and AFCI.

These and other aspects of the present invention are further described below.

IMPLEMENTATIONS AND EXAMPLES OF THE INVENTION

Without intent to limit the scope of the invention, exemplary configurations and their related results according to the embodiments of the present invention are given below. Note again that titles or subtitles may be used in the examples for convenience of a reader, which in no way should limit the scope of the invention.

Figure 2:
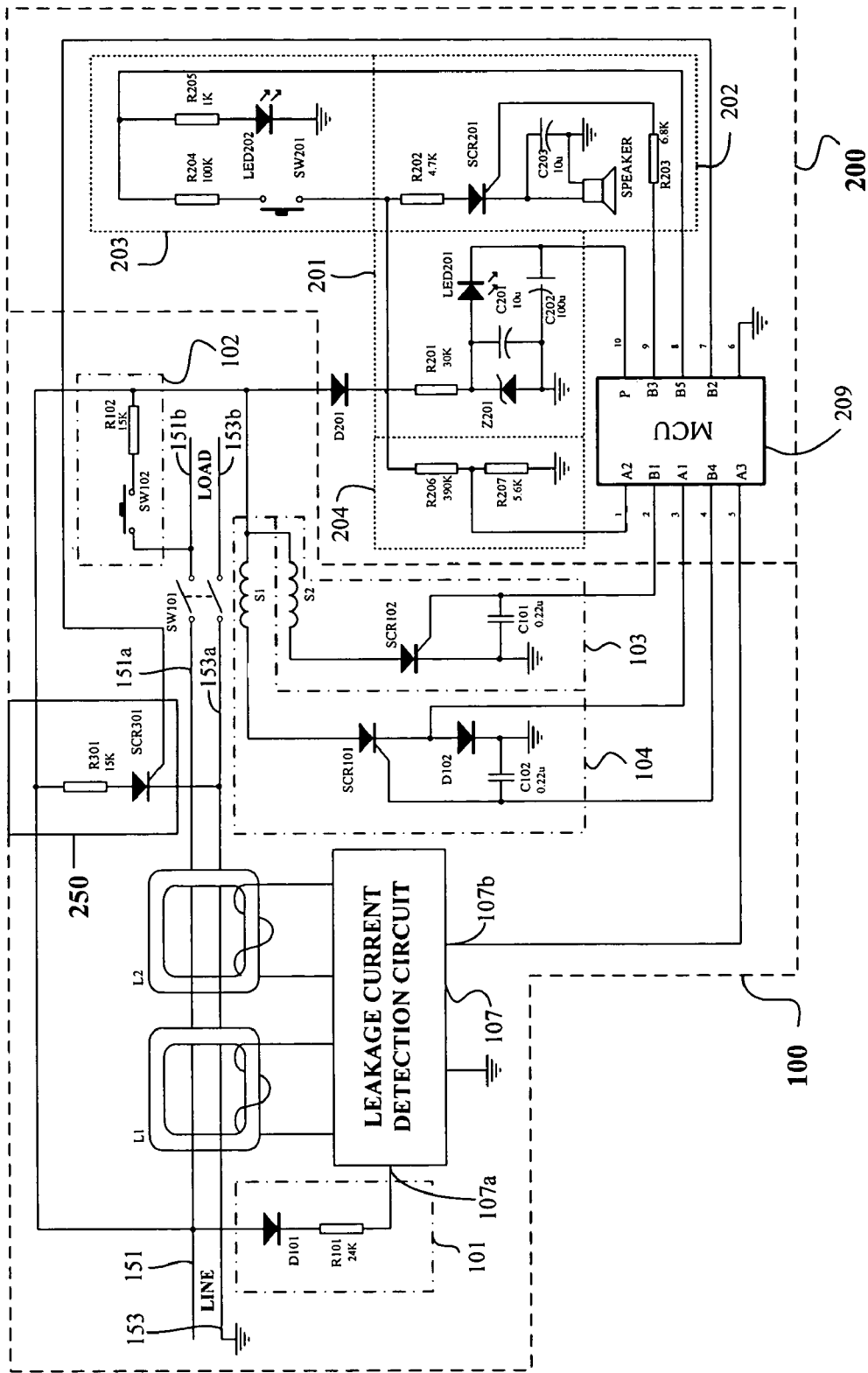
FIG. 2 shows a circuit diagram of an apparatus for intelligently testing the life of a leakage current protection device according to one embodiment of the present invention.

Referring to FIGS. 1 and 2, and first to FIG. 1, a block diagram of an apparatus for intelligently testing the life of a leakage current protection device is shown according to one embodiment of the present invention. The apparatus 300 includes a leakage current protection circuit 100, an intelligent life testing and alarm circuit 200 based on an MCU 209, and a ground fault simulation unit 250 for generating a simulated leakage current.

The leakage current protection circuit 100 has a first input 151, a second input 153, a third input 155, a fourth input 157, a first output 172, a second output 174, a third output 176, a reset circuit 103 having an input 103a that is electrically coupled to the third input 155, and an output 103b that is electrically coupled to the first output 172, a trip coil circuit 104 having a switching device SCR101 that has a gate, an anode and a cathode, a first input 104a1 that is electrically coupled to the output 103b of the reset circuit 103 and the first output 172, a second input 104a2 that is electrically coupled to the fourth input 157, an output 104b that is electrically coupled to the second output 174, and a leakage current detection circuit 107 having an output 107b that is electrically coupled to the third output 176 of the leakage current protection circuit 100. The first input 151 and the second input 153 of the leakage current protection circuit 100 are operatively coupled to a line phase terminal and a line neutral terminal of an AC power supply. The leakage current protection circuit 100 also includes a trip switch SW101 having two LINE terminals 151a and 153a that are electrically coupled to the first input 151 and the second input 153, respectively, and two LOAD terminals 151b and 153b that are electrically coupled to the inputs of an electrical appliance, respectively, as shown in FIG. 2.

The intelligent life testing and alarm circuit 200 has an MCU 209, a power grid signal synchronization monitoring circuit 204, a power supply circuit 201 and an alarm circuit 208. The MCU 209 includes a first input A1 that is electrically coupled to the second output 174 of the leakage current protection device 100, a second input A2, a third input A3 that is electrically coupled to the output 107b of the leakage current detection device 107 and the third output 176 of the leakage current protection device 100, a first output B1 that is electrically coupled to the third input 155 of the leakage current protection device 100, a second output B2, a third output B3, a fourth output B4 that is electrically coupled to the second input 104*a*2 of the trip coil circuit 104 and the fourth input 157 of the leakage current protection device 100, and a power supply input P.

The power grid signal synchronization monitoring circuit 204 has an input 204*a* that is electrically coupled to the first output 172 of the leakage current protection device 100, and an output 204*b* that is electrically coupled to the second input A2 of the MCU 209. The alarm circuit 208 has an input 208*a* that is electrically coupled to the third output B3 of the MCU 209, and a power supply input 208*p*. The power supply circuit 201 has an input 201*a* that is electrically coupled to the first output 172 of the leakage current protection device 100, and an output 201*b* that is electrically coupled to the power supply input P of the MCU 209 and the power supply input 208*p* of the alarm circuit 208.

The ground fault simulation unit 250 includes an input 250*a* that is electrically coupled to the second output B2 of the MCU 209, a first output 250*b*1 that is electrically coupled to the first input 151 of the leakage current protection device 100 and a second output 250*b*2 that is electrically coupled to the second input 153 of the leakage current protection device 100.

In operation, the power grid signal synchronization monitoring circuit 204 generates a first signal that is synchronized with an AC power from the first input 151 and the second input 153 of the leakage current protection device 100 to form a power grid signal synchronization signal, the power grid signal synchronization signal is electrically coupled to the second input A2 of the MCU 209; the MCU 209 generates when the power grid signal synchronization signal reduces to a first predetermined threshold value during every positive half-wave of the AC power, and a second signal from the second output B2 to the ground fault simulation unit 250 to generate a simulated ground fault signal; the leakage current detection circuit 107 generates a third signal in responsive to the simulated ground fault signal and the pulse signal, which is input into the third input A3 of the MCU209; the gate of the switching device SCR101 receives the pulse signal to turn the switching device SCR101 into its conductive state during the pulse period; the MCU 209 receives a DC voltage at the first input A1 of the MCU 209, and the MCU 209 compares the DC voltage with a second predetermined threshold value to determine whether a fault exists in the leakage current protection device 100, and activates the alarm circuit 208 if at least one fault exists.

The MCU 209 is programmable. In one embodiment, the MCU 209 is programmed such that if the DC voltage is greater than the predetermined threshold value, no fault exists in the leakage current protection device 100, and if the DC voltage is less than the predetermined threshold value, at least one fault exists in the leakage current protection device 100. The apparatus 300 provides a surge protection function. When the voltage at the first input 151 and the second input 153 of the leakage current protection device 100 exceeds a third predetermined threshold value, the MCU 209 sends a signal to a switching device SCR101 to set the trip switch SW101 in its non-conductive state and to disconnect the AC power from the LINE terminals 151*a* and 153*a* to the LOAD terminals 151*b* and 153*b* of the trip switch SW101. The switching device SCR101 comprises a silicon controlled rectifier. When the switching device SCR101 is in its conductive state, the switching device SCR101 passes current in the positive half-wave of the AC power to set the trip switch SW101 in its non-conductive state and to disconnect the AC power from the LINE terminals to the LOAD terminals of the trip switch SW101.

During the time period when the trip switch SW101 is in the non-conductive state, the apparatus 300 continues to detect faults of the leakage current protection device 100. When the trip switch SW101 is in the non-conductive state for a predetermined timeout period and the MCU 209 does not detect any fault in the leakage current protection device 100, the MCU 209 sends a signal to a reset switching device SCR102 to set the trip switch SW101 in the conductive state and to connect the AC power from the LINE terminals to the LOAD terminals of the trip switch SW101. The length of the predetermined timeout period is adjustable. Accordingly, the apparatus 200 also provides an automatic reset function.

When the MCU 209 determines that at least one fault exists, the MCU 209 sends an alarm signal to the alarm circuit 208, and the alarm circuit 208 receives the alarm signal and generates an alarm. In one embodiment, the alarm circuit 208 comprises at least one of an audio alarm circuit 202 for generating an audible alarm and a visual alarm circuit 203 for generating a visible alarm.

FIG. 2 shows a circuit diagram of an apparatus for intelligently testing the life of a leakage current protection device according to one embodiment of the present invention. The apparatus 300 includes a ground fault simulation unit 250 for generating a simulated leakage current, a leakage current protection circuit 100, and an intelligent life testing and alarm circuit 200 based on an MCU 209.

The ground fault simulation unit 250 has a switching device SCR301 having a gate, an anode and a cathode, and a resistor R301. The resistor R301 is electrically connected between the hot wire (through the line phase terminal 151) of the AC power supply and the anode of the switching device SCR301. The cathode of the switching device SCR301 is connected to the line neutral terminal 153*a* of the trip switch SW101 which is electrically connected to the neutral wire 153 of the AC power supply after passing through two inductive coils L1 and L2. The gate of the switching device SCR301 is electrically connected to an output pin 7 (B2) of the MCU 209. When a signal output from the output pin 7 (B2) of the MCU 209 is received by the gate of the switching device SCR301, it can set the switching device SCR301 in either its conductive or its non-conductive state, depending on the output signal of the MCU 209. When the voltage at the output pin 7 (B2) of the MCU 209 reaches a predetermined voltage level, the voltage at the gate of the switching device SCR301 sets the switching device SCR301 in the conductive state, thereby causing an imbalance between the currents passing through the line phase terminal 151 (hot wire) and the line neutral terminal 153, which can be detected by the leakage current detection circuit 107 electrically coupled with the inductive coils L1 and L2.

The leakage current protection device 100 comprises two inductive coils L1 and L2 adapted for detecting a leakage current, a leakage current detection circuit 107, a half-wave rectification circuit 101, a manual testing circuit 102, a reset circuit 103, a trip coil circuit 104 and a trip switch SW101. The trip switch SW101 has a pair of LINE terminals (a line phase terminal 151*a* and a line neutral terminal 153*a*) in one side and a pair of LOAD terminals 151*b* and 153*b* in another side, where the line phase terminal 151*a* and the line neutral terminal 153*a* pass through both inductive coils L1 and L2 and are connected to a line phase terminal 151 and a line neutral terminal 153, respectively, of an AC power supplier, and a pair of LOAD terminals 151*b* and 153*b* are connected to one or more loads. When the trip switch SW101 is in its conductive state, the AC power is supplied from the LINE terminals to the LOAD terminals. When the trip switch SW101 is in its non-conductive state, no AC power is supplied from the pair of LINE terminals to the pair of LOAD terminals. Each of inductive coils L1 and L2 electrically coupled to the leakage current detection circuit 107.

The half-wave rectification circuit 101 includes a rectifier diode D101 having a cathode and an anode connected to the line phase terminal 151, and a current limiting resistor R101 having two terminals with one connected to the cathode of the rectifier diode D101 and the other connected to an input 107a of the leakage current detection circuit 107. The line phase terminal 151 is corresponding to the first input of the leakage current protection device 100, while the line neutral terminal 153 is corresponding to the second input of the leakage current protection device 100, as shown in FIG. 1. The half-wave rectification circuit 101 provides a DC power to the leakage current detection circuit 107.

The manual testing circuit 102 has a push-on release-off switch SW102 having two terminals and a resistor R102 having two terminals with one electrically coupled to the line phase terminal 151 and the other connected to one terminal of the push-on release-off switch SW102, whose other terminal is connected to a LOAD terminal 151b of the trip switch SW101. The LOAD terminal 151b of the trip switch SW101 is connected to the line phase terminal 151a of the trip switch SW101 when the trip switch SW101 is in its conductive state. Thus, the push-on release-off switch SW102 and the resistor R102 are connected in series. The manual testing circuit 102 is adapted for manually testing the leakage current protection device.

The reset circuit 103 comprises a switching device SCR102 having a gate, an anode and a cathode, a capacitor C101 having two terminals and a reset coil S2 having two terminals. As shown in FIG. 2, the switching device SCR102 and the reset coil S2 are connected in series, and the switching device SCR102 and the capacitor C101 are connected in parallel. Specifically, the reset coil S2 has one terminal electrically coupled to the line phase terminal 151 and the other terminal connected to the anode of the switching device SCR102, and the capacitor C101 has its one terminal connected to the gate of the switching device SCR102 and the other terminal connected to the cathode of the switching device SCR102, which is grounded. The gate of the switching device SCR102 is in turn connected to a pin 2 (B1) of the MCU 209. An input signal to the gate of the switching device SCR102 can make the switching device SCR102 either in its conductive or its non-conductive state. When the switching device SCR102 is in the conductive state, the reset coil S2 is electrically coupled to an AC power supply (through the line phase terminal 151) and the reset coil S2 maintains the trip switch SW101 in the conductive state such that the AC power is connected from the LINE terminals 151a and 153a to the LOAD terminals 151b and 153b of the trip switch SW101.

The trip coil circuit 104 comprises a switching device SCR101 having a gate, an anode and a cathode, a capacitor C102 having two terminals, a diode D102 having an anode and a cathode and a trip coil S1 having two terminals, as shown in FIG. 2. The trip coil S1 has its one terminal electrically coupled to the line phase terminal 151 and the other terminal connected to the anode of the switching device SCR101. The capacitor C102 has its one terminal connected to the gate of the switching device SCR101 and the other terminal connected to the cathode of diode D102, respectively. The cathode of the switching device SCR101 is electrically connected to the anode of the diode D102, whose cathode is grounded. Furthermore, the gate of the switching device SCR101 is connected to a pin 4 (B4) of the MCU 209. The cathode of the switching device SCR101 (the anode of the diode D102) is also connected to a pin 3 (A1) of the MCU 209.

For such a configuration, when the switching device SCR101 is in its conductive state, the trip coil S1 is connected to an AC power supply (through the line phase terminal 151) and the trip coil S1 sets the trip switch SW101 into its non-conductive state (a trip state). The trip switch SW101 maintains its state until a current passes through either the trip coil S1 or the reset coil S2. The trip switch SW101 responds to the action of the trip coil S1 and the reset coil S2. When the leakage current detection circuit 107 detects a leakage current, the leakage current detection circuit 107 generates a signal that is sent to the pin 5 (A3) of the MCU 209. Then the MCU 209 responsively send a signal from the pin 4 (B4) to the gate of the switch device SCR101 to set the switch device SCR101 in its conductive state. Accordingly, the power supply energizes the trip coil S1 to set the trip switch SW101 in its non-conductive state so that the AC power is disconnected from the LINE terminals 151a and 153a to the LOAD terminals 151b and 153b of trip switch SW101, i.e. in the trip state. The reset circuit 103, on the other hand, energizes the reset coil S2 through the switching device SCR102 to reset the trip switch SW101 back to the conductive state so that the AC power is connected from the LINE terminal 151a and 153a to the LOAD terminals 151b and 153b of the trip switch SW101.

The intelligent life testing and alarm circuit 200 has the MCU 209, a power supply 201 electrically coupled to the MCU 209, a power grid signal synchronization monitoring circuit 204, and an alarm unit 202 and/or 203.

The MCU 209 includes a general purpose integrated circuit with a timer function, or an application specific integrated circuit such as a 555 timer chip.

The power supply circuit 201 comprises a rectifying diode D201, a resistor R201, a regulator diode Z201, a first voltage stabilizing capacitor C201, a second voltage stabilizing capacitor C202, and a light emitting diode LED201. The anode of the diode D201 is electrically connected to the hot wire of the AC power through the line phase terminal 151. The cathode terminal of the diode D201 is electrically connected to a first end of the resistor R201. A second end of the resistor R201 is electrically connected to a terminal Vcc and provides a DC power supply voltage to the terminal Vcc. The regulator diode Z201 has its cathode and anode electrically connected to the terminal Vcc and the ground, respectively. The first voltage stabilizing capacitors C201 has its two terminals electrically connected to the electrically connected to the terminal Vcc and the ground, respectively, as well. The regulator diode Z201 and first voltage stabilizing capacitors C201 coupled to each other in parallel to form a voltage regulator to further regulate the voltage of the terminal Vcc. The light emitting diode LED201 has its anode electrically connected to the terminal Vcc and its cathode electrically connected to one terminal of the second voltage stabilizing capacitor C202, which is electrically connected to a pin 10 (P) of the MCU 209 for supplying the power from the power supply circuit 201 to the MCU 209. The other terminal of the second voltage stabilizing capacitor C202 is electrically connected to the anode of the regulator diode Z20, which is electrically connected to the ground. The regulator diode Z201 and the voltage stabilizing capacitor C202 are adapted for regulating the power supply to an appropriate voltage for the MCU 209. The LED201 may also be used as an indication of working conditions of the leakage current protection device unit 100.

The power grid signal synchronization monitoring circuit 204 includes a voltage divider having a first resistor R206 and a second resistor R207. The input to the circuit 294 is a DC power supplied from the cathode of the diode D201. The first resistor R206 and the second resistor R207 forming the voltage divider are adapted for reducing the DC voltage to an appropriate value of voltages, inputting to the input pin 1 (A2) of the MCU 209. The output signal to the MCU 209 is a synchronized half-wave waveform used as a sampling of the power grid alternate current waveform.

The alarm unit includes at least of an audio alarm circuit 202 and a visual alarm circuit 203. As shown in FIG. 2, the alarm unit comprises both the audio alarm circuit 202 and the visual alarm circuit 203.

In this embodiment shown in FIG. 2, the audio alarm circuit 202 has a speaker, a switching device SCR201, and a voltage dividing resistor R202. A transistor or an SCR may be used as the switching device, depending upon applications. A DC voltage output from the half-wave rectifier D201 is applied to the speaker through the voltage dividing resistor R202 and the switching device SCR201. Normally, the switching device SCR201 is in a non-conductive state and the speaker remains silent. When an output from the pin 9 (B2) of the MCU 209, electrically connected to the gate of the switching device SCR201 turns the switching device SCR201 to its conductive state, the speaker produces an audible alarm. An optional integrated circuit may be used to generate special alarm sounds.

In this embodiment shown in FIG. 2, the visual alarm circuit 203 has a resistor R203, a light emitting diode LED202, a switch SW201 and a resistor R204. The switch SW201 has its one terminal electrically connected to the cathode of the diode D201 of the power supply circuit 201 and the other terminal electrically connected to one terminal of the resistor R204 whose other terminal is electrically connected to the pin 8 (B3) of the MCU 209. The resistor R203 is electrically connected between the other terminal of the resistor R204 and the anode of the light emitting diode LED202 whose cathode is grounded. Normally, the output at the pin 8 (B3) of the MCU 209 is in a low voltage state and the LED202 is not lit. When the MCU 209 detects the malfunction of the leakage current detection circuit 107 or the trip coil S1, the output at the pin 8 of the MCU 209 is in a high voltage state, which causes the light emitting diode LED202 to generate a visible alarm. The switch SW201 is a mechanical contact switch associated with trip protections. When the leakage current protection device 100 trips, the switch SW201 is set in its conductive state, causing the lighting of the LED202. The lighting of the LED202 indicates either the leakage current protection device unit 100 is in a trip condition or the leakage current detection circuit 100 is not working properly.

Figure 3:
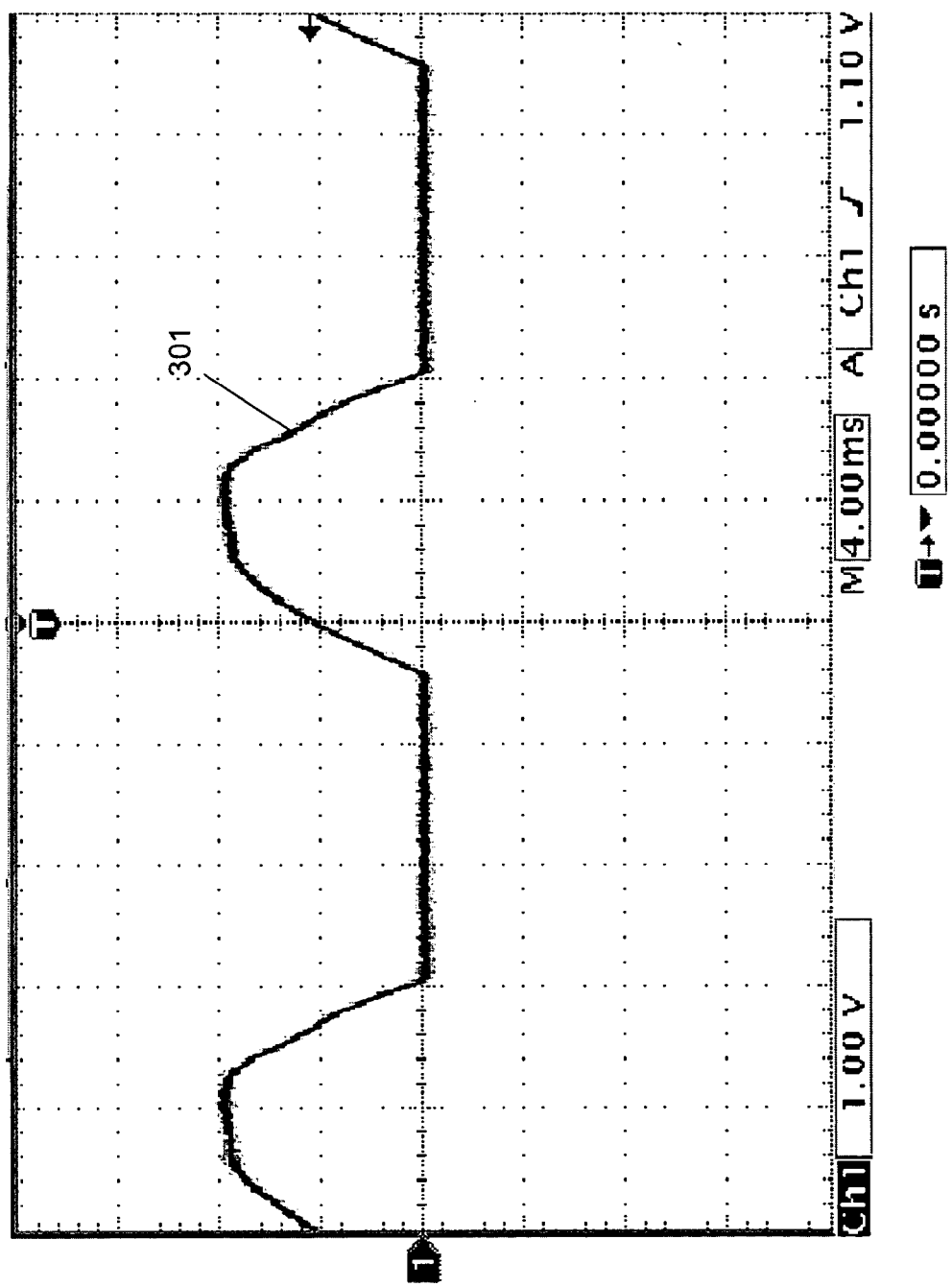
FIG. 3 shows a power grid synchronized half wave signal measured from a power grid synchronization monitoring circuit at the input pin 1 of an MCU shown in FIG. 2, according to one embodiment of the present invention.
Figure 4:
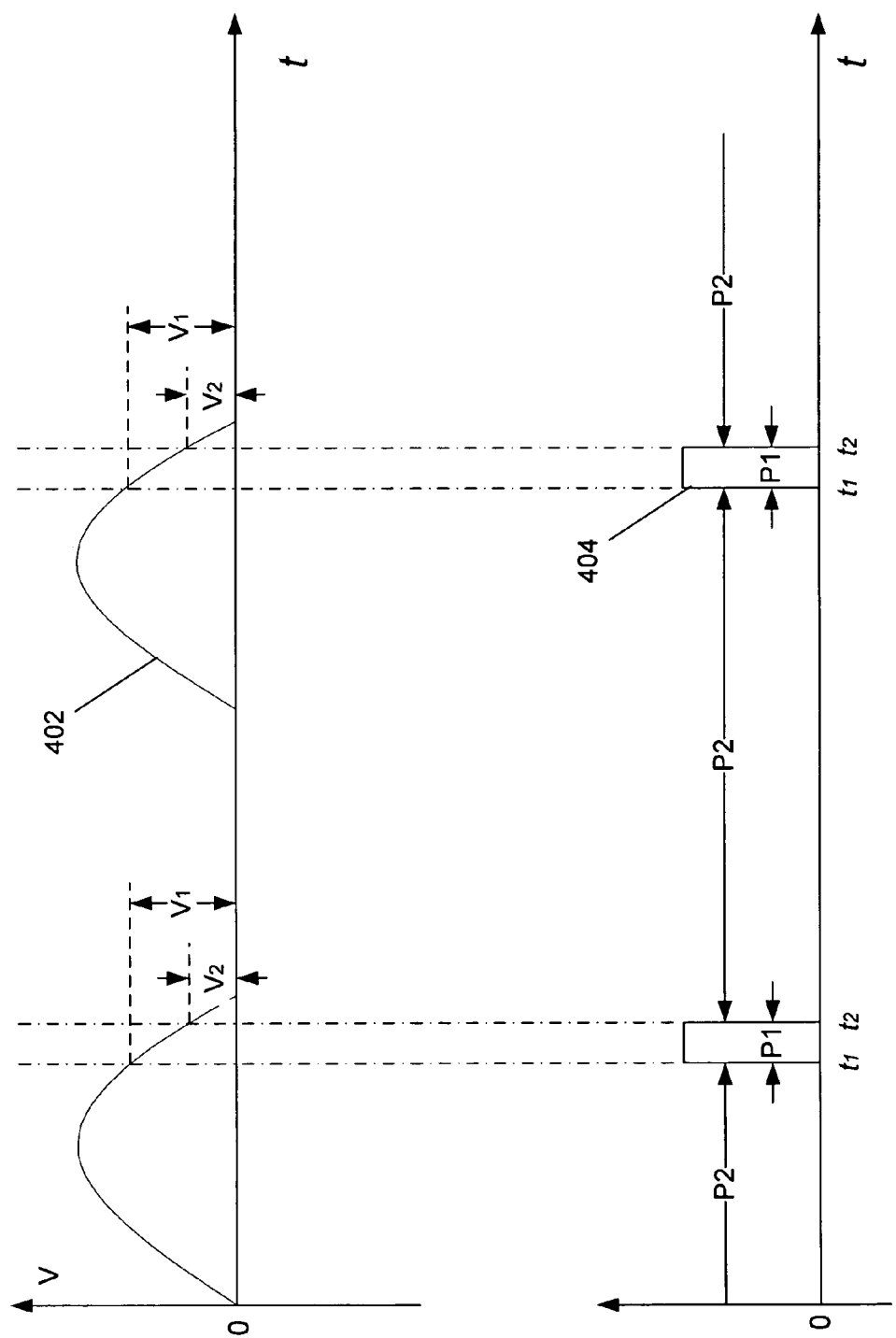
FIG. 4 illustrates the length of a first life testing detection period P1, a second life testing detection period P2, and their relation to the synchronized half wave signal as shown in FIG. 3, according to one embodiment of the present invention.

Referring now to FIGS. 3 and 4, the length and relative phase of a first life testing detection period P1, a second life testing detection period P2, and their relation to a power grid signal are illustrated according to one embodiment of the present invention. A completed output waveform 301 of the voltage of the power grid signal synchronization monitoring circuit 204 is illustrated in FIG. 3. Since the input to the power grid signal synchronization monitoring circuit 204 is the output of the rectifying diode D102, only the positive half cycle is shown. This complete cycle is divided into two independent time periods: a first life testing detection period P1 and a second life testing detection period P2, as shown in FIG. 4. The first life testing detection period P1 starts at t1 after the power grid reaches its peak. After the AC power reaches its peak, the voltage of the AC power starts to decrease. The voltage of the synchronized power grid signal starts to decrease since it is proportional to the AC power during its positive half cycle. The input pin 1 of the MCU receives this voltage and compares to a predetermined voltage value $V_1$. When the voltage of the synchronized power grid signal decreases to a level that is less than the predetermined voltage value $V_1$, the MCU suspends its leakage current detection and starts life testing detection and the first life testing detection period P1. The AC power voltage continues to decrease until it reaches another level that is less than another predetermined voltage value $V_2$, at time $t_2$. At this time, the MCU resumes its leakage current detection, stops the first life testing detection period P1 and starts the second life testing detection period P2. At least one of the starting time $t_1$ of P1 and $t_2$ of P2 is adjustable. The adjustment is made by adjusting at least one of the predetermined voltage values $V_1$ and $V_2$. On the other hand, at least one of the length of the first life testing detection period P1 and the length of the second life testing detection period P2 is adjustable in a similar manner. This cycle repeats for every complete cycle of the AC power.

Without limit the scope of the present invention, different units utilized in the apparatus for testing the life of a leakage current protection device according to the present invention are described briefly as follows. These units include, but not limited to, ground fault simulation unit, life testing detection control unit, fault detector for leakage current detection circuit and trip mechanism.

Ground Fault Simulation Unit

The ground fault simulation unit 250, as shown in FIG. 2, comprises a switching device SCR301 have a gate, an anode and a cathode, and a resistor R301 having a first terminal and a second terminal. The first terminal of the first resistor R301 is electrically coupled to the hot wire (through the line phase terminal 151) of the AC power supply. The second terminal of the first resistor R301 is connected to the anode of the switching device SCR301. The cathode of the switching device SCR301 is connected to the line neutral terminal 153a of the trip switch SW010 which is electrically connected to the neutral wire 153 of the AC power supply after passing through two inductive coils L1 and L2. The gate of the switching device SCR301 is electrically connected to an output pin 7 (B2) of the MCU 209. The output signal from pin 7 (B2) of the MCU 209 is sent to the gate of the switching device SCR301 to set the switching device SCR301 in either its conductive or its non-conductive state, depending on the output signal of the MCU 209. When the voltage at the output pin 7 (B2) of the MCU 209 reaches a predetermined voltage level, the voltage at the gate of the switching device SCR301 sets the switching device SCR301 in the conductive state. Because of the configuration shown in FIG. 2, the switching device SCR301 passes a current only when the AC power enters positive half-wave so that a simulated ground fault is generated between the hot wire and neutral wire of the AC power supply. When the AC power enters a negative half wave of the AC power, the switching device SCR301 is automatically set into the non-conductive state where no current is allowed to pass through.

Life Testing Detection Control Unit

The life testing detection control unit includes an MCU 209, and an alarm unit having an audio alarm circuit 202 and a visual alarm unit 203. The MCU 209 can be an independent unit or a shared unit with the life testing detection control unit, the fault detector for the leakage current detection circuit and the trip mechanism. If a fault exists in the leakage current detection circuit and the trip mechanism of the leakage current protection device, the MCU 209 activates the alarm unit. When a fault occurs, the audio alarm circuit 202 generates an audible alarm, and the LED LED202 of the visual alarm circuit 203 generates a visible alarm to alert user of the leakage current protection device. An application specific integrated circuit (ASIC) may be used to generate specific alarm sounds with the speaker. A regular speaker or a piezo buzzer may be used as the speaker in the circuit.

Fault Detector for Leakage Current Detection Circuit and Trip Mechanism

A fault detector for a leakage current detection circuit and trip mechanism includes the MCU 209, the power supply 201 electrically coupled to the MCU 209, the ground fault simulation unit 250, the trip coil circuit 104, and the alarm unit. The MCU 209 can be an independent unit or a shared unit with the life testing detection control unit according to embodiments of the present invention. The MCU 209 is a main control unit for the intelligent life testing detection device of the leakage current protection device. In one embodiment, the MCU 209 includes a general purpose integrated circuit with a timer function, or an application specific integrated circuit such as a 555 timer chip.

Figure 5:
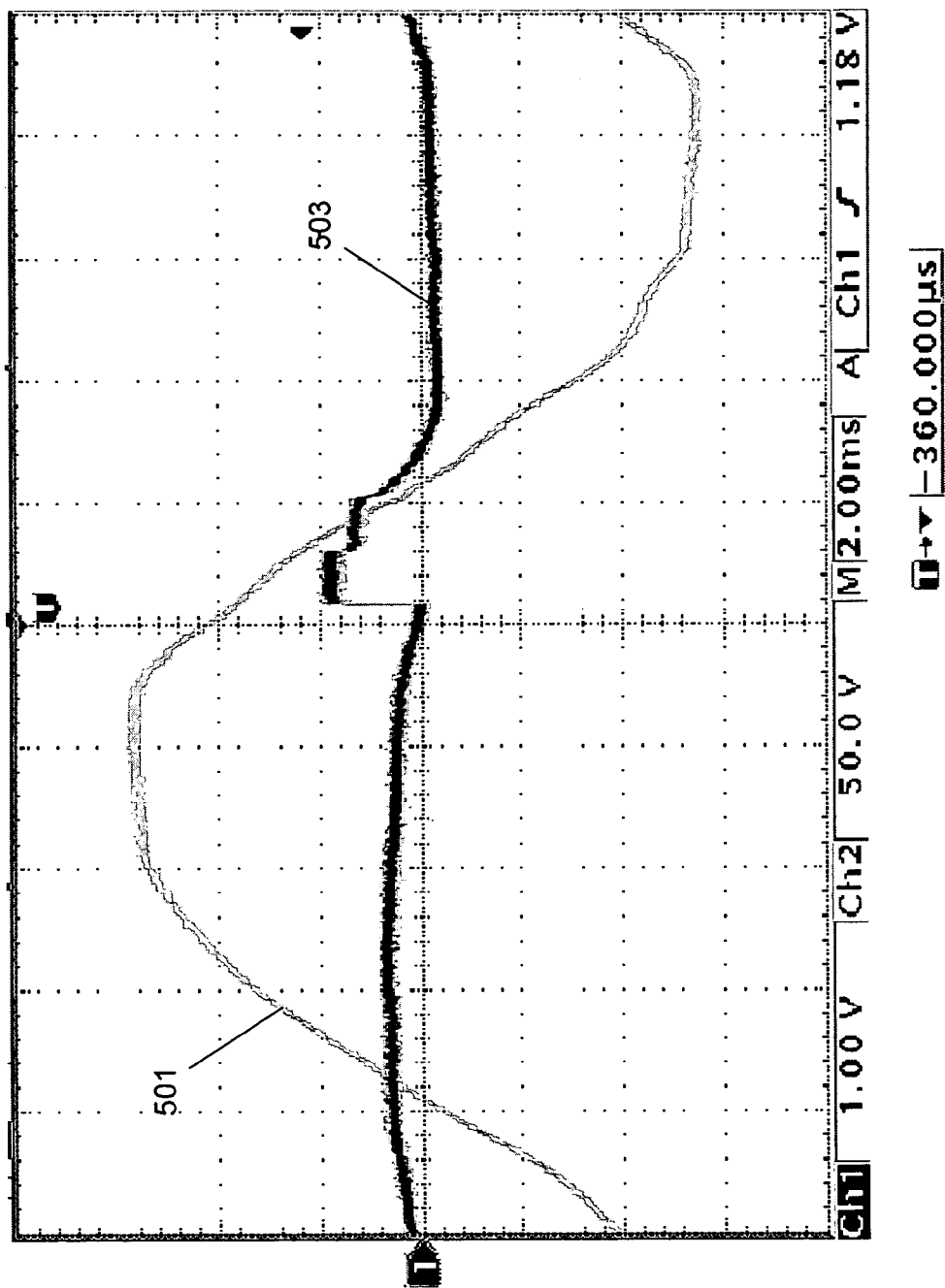
FIG. 5 shows a signal received at the gate of a switching device of a ground fault simulation unit shown in FIG. 2, according to one embodiment of the present invention.

The power grid signal synchronization monitoring circuit 204 provides a power grid synchronization signal. The input to the power grid signal synchronization monitoring circuit 204 is electrically coupled to the power grid through the cathode of the diode D201 of the power supply 201. As shown in FIG. 3, the output signal 301 of the power grid signal synchronization monitoring circuit 204 shows only the positive half of the power grid waveform. The positive half of the power grid waveform passes through a voltage divider having a first resistor R206, and a second resistor R207, so that the output voltage of the power grid synchronization monitoring circuit 204 reaches an appropriate level. In one embodiment, the values of the resistance of the first resistor R206 and the second resistor R207 are chosen so that the ratio of voltages across the first resistor R205 and across the second resistor R207 is in a range of about 50-200. The power grid synchronized signal is sent to the input pin 1 (A2) of the MCU 209. When the descending edge of the waveform of the power grid synchronized signal 402 reaches a first predetermined voltage value, for example, $V_1$, the first life testing detection period P1 starts. The leakage current detection is suspended. At this point, the MCU 209 sends out a signal from the output pin 7 (B2) to the gate of the switching device SCR301 of the ground fault simulation unit 250 so as to generate a simulated ground fault signal during the life testing detection window, as shown in FIG. 5. If there is no fault in the leakage current detection circuit 107 of the leakage current protection device 100, the output of the leakage current detection circuit 107 generates a detectable pulse signal at the input pin 5 (A3) of the MCU 209, in response to the simulated ground fault signal. The pulse signal is shown as the first pulse 701 in FIG. 8. If the pulse signal 701 is received at the input pin 5 (A3) of the MCU 209 during the first life testing detection period P1, the leakage current detection circuit 107 of the leakage current protection device 100 works properly and no fault exists in the leakage current detection circuit of the leakage current protection device. Otherwise, if the pulse signal is not received at the input pin 5 of the MCU during the first life testing detection period P1, the leakage current detection circuit of the leakage current protection device does not work properly and at least one fault exists in the leakage current detection circuit of the leakage current protection device.

When the descending edge of the waveform of the power grid synchronized signal reaches a second predetermined voltage value $V_2$, the first life testing detection period P1 ends and the second life testing detection period P2 starts. The leakage current detection is resumed. At this point, the output pin 4 of the MCU sends out a short pulse as shown in FIG. 6.

Figure 6:
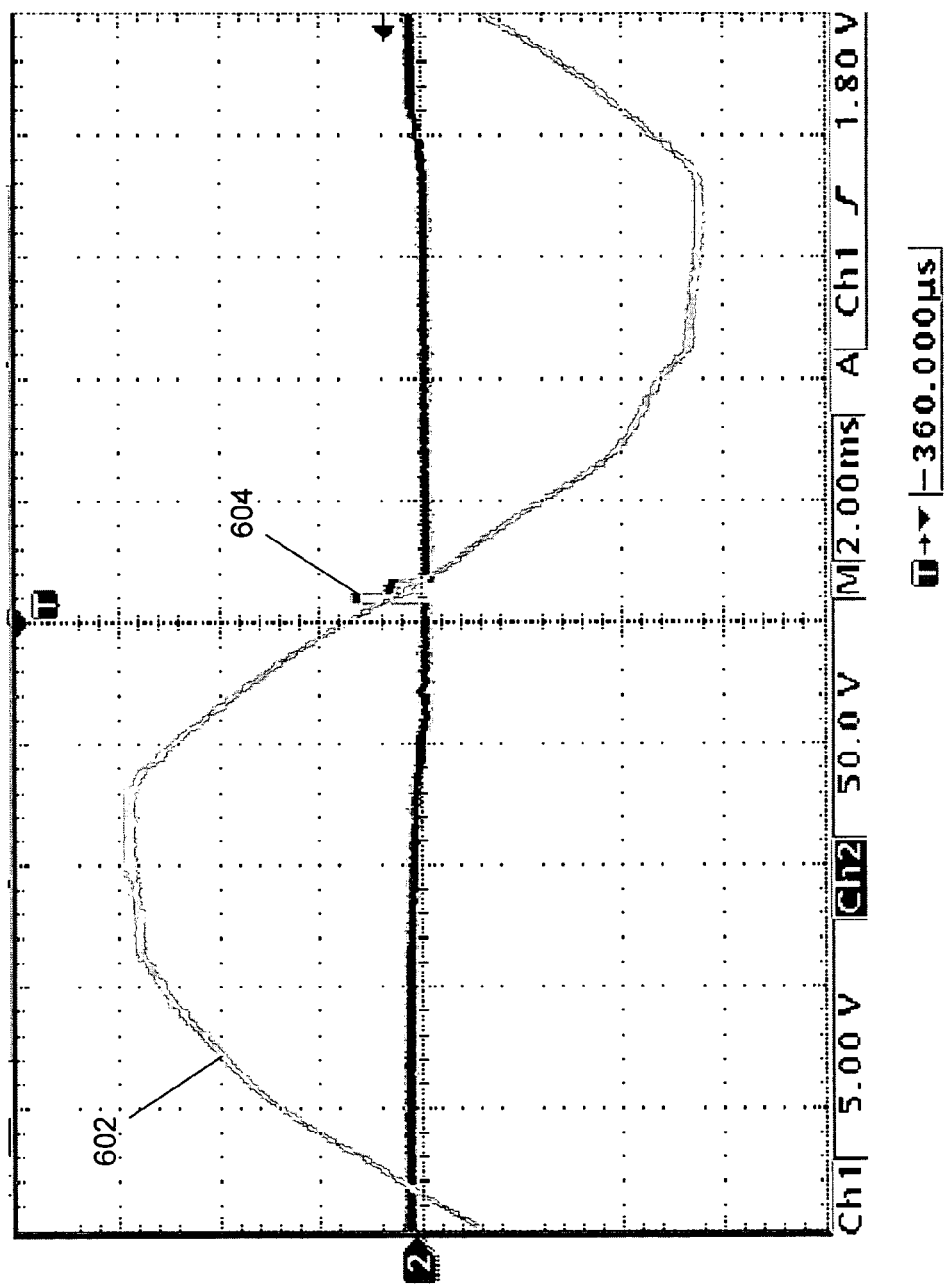
FIG. 6 shows a signal received at the gate of a switching device of a trip coil circuit shown in FIG. 2, according to one embodiment of the present invention.

In FIG. 6, the pulse signal is overlaid with a power grid waveform to show the phase relationship between the pulse signal and the power grid waveform. This pulse sets the switching device SCR101 in conductive state. After a brief delay, the voltage at the anode of the switching device SCR101 is measured through an A/D converter of the pin 3 of the MCU. If the voltage is at or near a predetermined threshold while the switching device SCR101 is in conductive state during the pulse period, then the trip coil circuit and trip mechanism is working properly.

The pulse is very short in time, but it is long enough to set the switching device SCR101 in its conductive state to allow a current to pass through. The voltage across a p-n junction is about 0.7 V for a silicon type SCR. The voltage across a p-n junction is about 0.3 V for a Germanium type SCR. A second pulse signal is detected by the pin 3 of the MCU as shown as pulse signal 702 in FIG. 8. This second pulse signal is used to determine whether a fault exists in the trip mechanism. For example, if the trip coil S1 is broken, the trip coil S1 is unable to pass current from the AC power from the LINE terminal. Therefore, the peak value of the second pulse signal is very small or equals to zero. If this second pulse signal 702 is not detected at the pin 3 of the MCU, it indicates that at least one fault exists in the trip mechanism.

Figure 7:
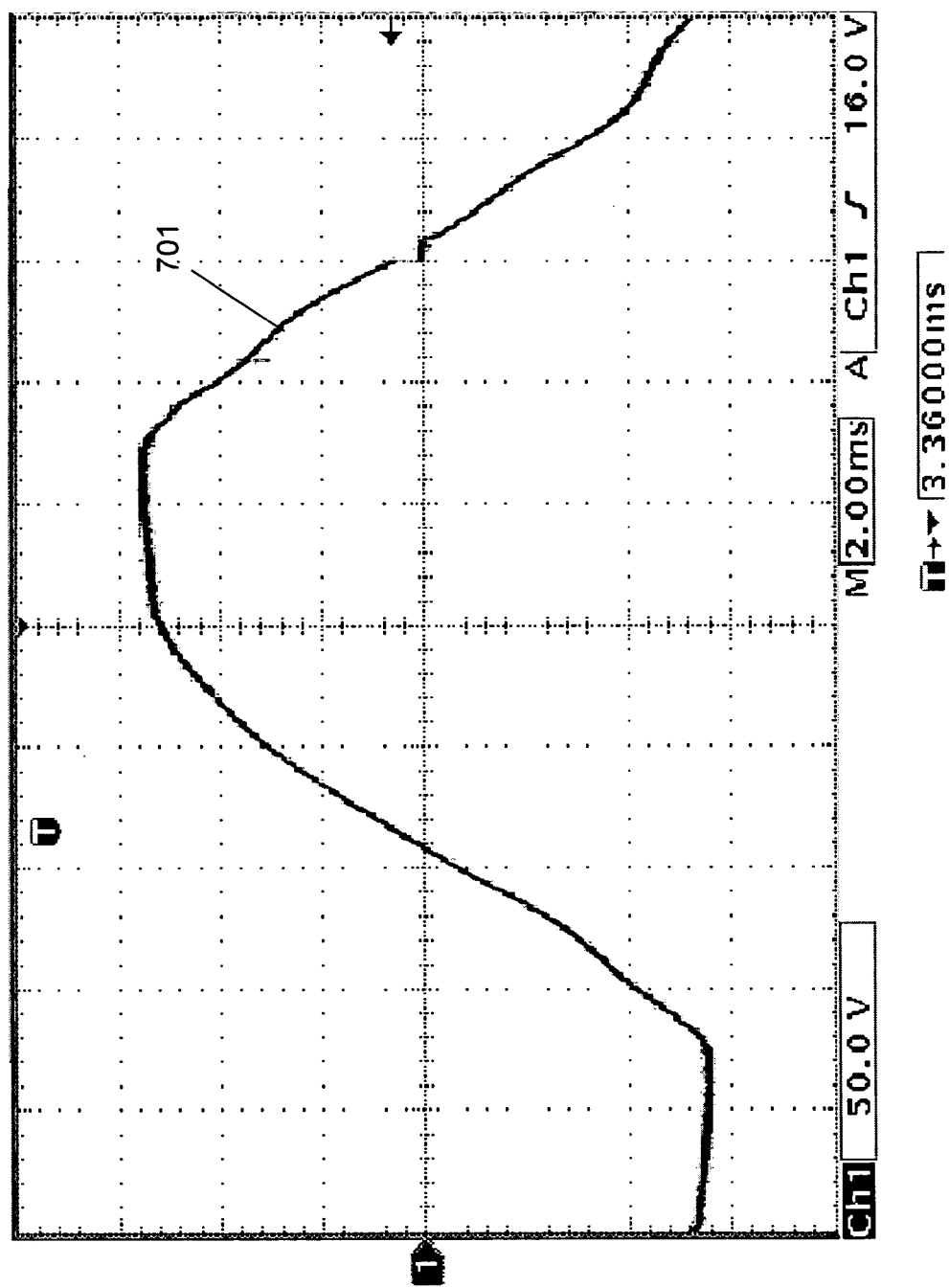
FIG. 7 shows a voltage waveform received at the anode of the switching device of the trip coil circuit shown in FIG. 2, according to one embodiment of the present invention.
Figure 8:
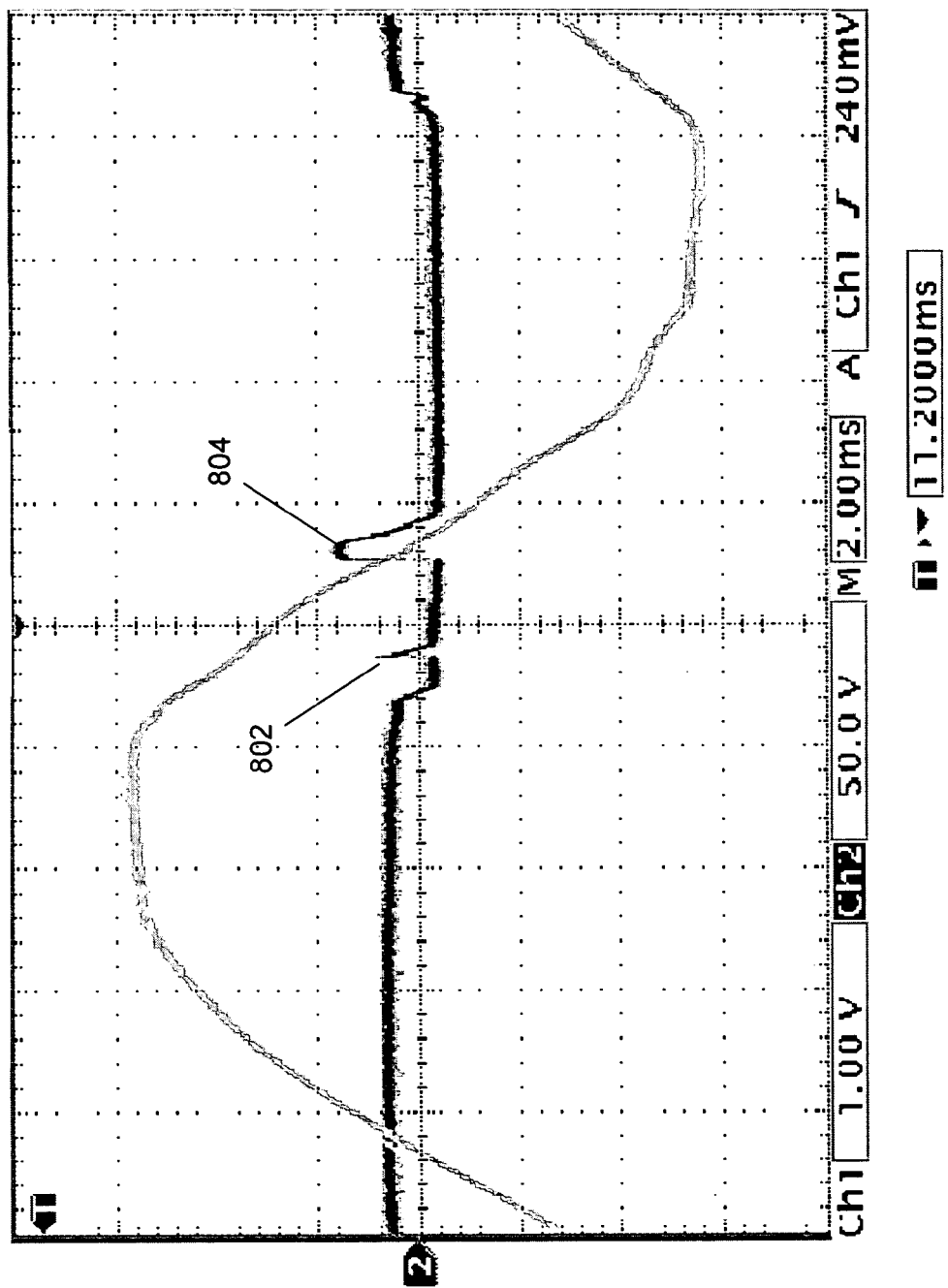
FIG. 8 shows a voltage waveform received at the anode of a diode of the trip coil circuit shown in FIG. 2, according to one embodiment of the present invention.
Figure 9:
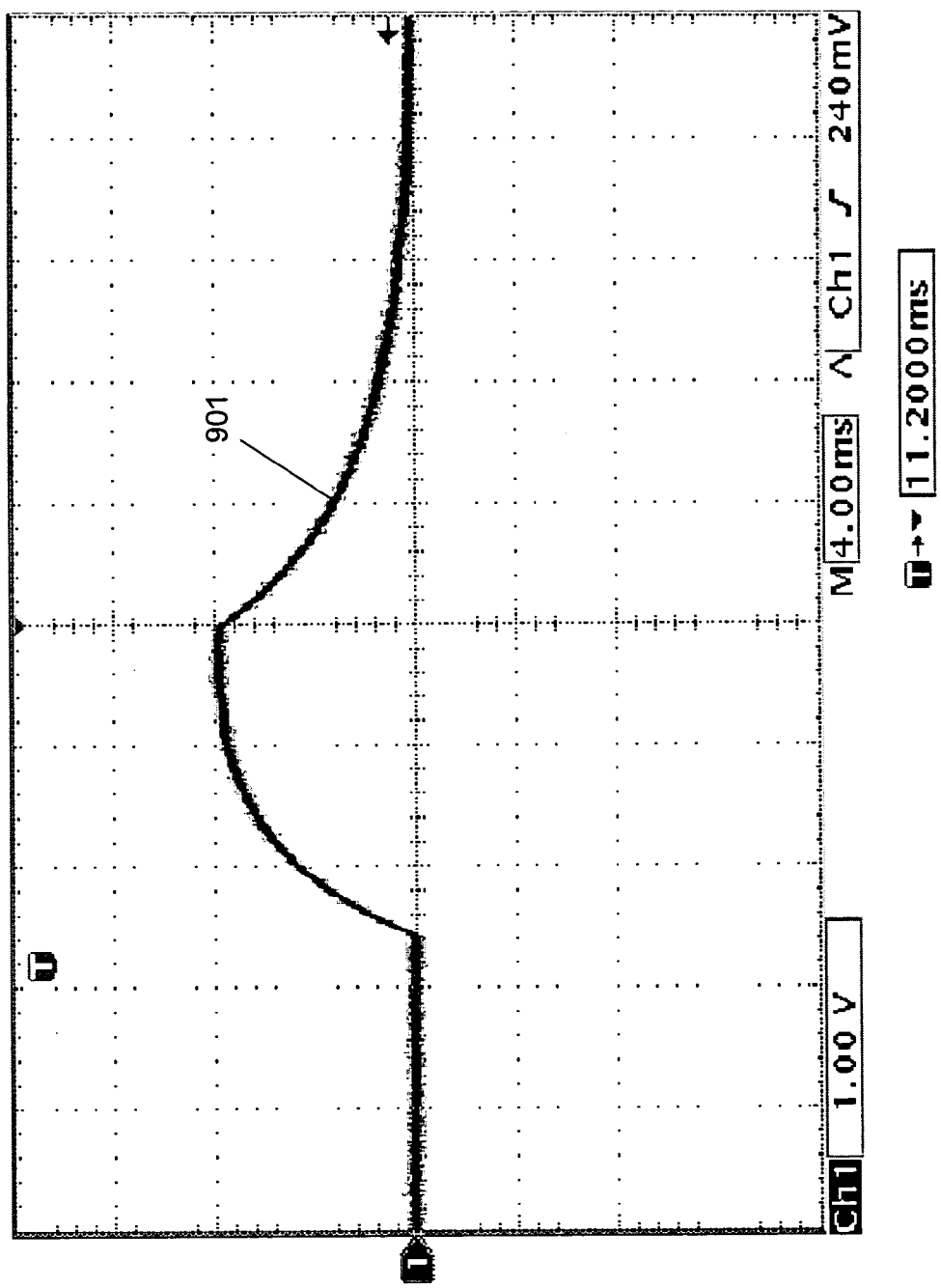
FIG. 9 shows an output voltage waveform of a leakage current detection circuit shown in FIG. 2, according to one embodiment of the present invention.

FIG. 7 shows the voltage measured at the anode of the switching device SCR101 according to one embodiment of the present invention. FIG. 8 shows the voltage measured at the anode of the diode D102 according to one embodiment of the present invention.

An alarm is generated by the MCU and sent to at least one of the audio alarm circuit 202 and the visual alarm circuit 203 of the life testing detection control unit when at least one fault exists in the leakage current detection circuit and the trip mechanism of the leakage current protection device. The audio alarm circuit 202 produces an audible alarm and the visual alarm circuit produces a visible alarm.

In one embodiment, the intelligent life testing detection device of the leakage current protection device provides surge protection functionality. When the voltage of an AC power input reaches an unusual level, such voltage surge may cause damage to electrical appliances connected to the LOAD terminal of a leakage current protection device. During a normal operation, the input voltage of the AC power is monitored by the power grid synchronization monitoring circuit 204. If the monitored voltage reaches a predetermined threshold, the output pin 4 of the MCU sets the switching device SCR101 in conductive state so that the trip mechanism is activated and the AC power from the LINE terminal of the leakage current protection device to the LOAD terminal is disconnected. Therefore, the surge protection functionality is provided by the intelligent life testing detection device of the leakage current protection device. An alarm signal is sent to the alarm unit to alert user of the leakage current protection device.

In another embodiment, the intelligent life testing detection device of the leakage current protection device can be automatically reset. When the intelligent life testing detection device of the leakage current protection device is in trip condition, the intelligent life testing detection device of the leakage current protection device is still working properly. After a predetermined period of time, the MCU attempts to reset the intelligent life testing detection device of the leakage current protection device by sending out pulse through pin 2 to set the switching device SCR102 of the reset circuit 103. If the leakage current is not longer present, then the intelligent life testing detection device of the leakage current protection device is successfully reset and the AC power is reconnected from the LINE terminal to the LOAD terminal of the leakage current protection device. Therefore the intelligent life testing detection device of the leakage current protection device provides an automatically reset function.

Another aspect of the present invention provides a method of intelligently testing the life of a leakage current protection device having a leakage current detection circuit and a trip mechanism. In one embodiment, the method comprises the steps of:

detecting fault in leakage current protection device with a fault detector; and alerting user of the leakage current protection device with a life testing detection unit having an MCU and an alarm unit when at least one fault is detected in the leakage current protection device.

The step of alerting user of the leakage current protection device with the alarm unit when at least one fault is detected in the leakage current protection device comprises at least one of the steps of:

alerting user of the leakage current protection device that at least one fault exists in the leakage current protection device with an audio alarm circuit 202; and alerting user of the leakage current protection device that at least one fault exists in the leakage current protection device with a visual alarm circuit 203.

The audio alarm circuit 202 is adapted to produce an audible alarm. The visual alarm circuit 203 is adapted to produce a visible alarm.

The step of detecting fault in leakage current protection device with the fault detector comprising the step of detecting fault in a leakage current detection circuit of the leakage current protection device with a fault detector. The fault detector comprises:

a ground fault simulation unit 250;

a trip coil circuit 104 having a switching device SCR101, a trip coil S1, and a trip switching SW101 having a LINE terminal for connecting to an AC power and a LOAD terminal;

a power grid signal synchronization monitoring circuit 204; and a reset circuit 103 having a reset coil S2, a reset switching device SCR102 and the trip switching SW101.

The step of detecting fault in leakage current protection device with the fault detector comprising the steps of:

sending a pulse signal to the gate of the switching device SCR101 at a predetermined phase of the AC power during positive half-wave of the AC power to generate a voltage at the cathode of the switching device SCR101;

sending a signal to the ground fault simulation unit 250 to generate a simulated ground fault for leakage current detection circuit during negative half of the AC power to generate a voltage at the gate of the switching device SCR101;

receiving the voltage at the cathode of the switching device SCR101 during the positive half-wave of the AC power;

receiving the voltage at the gate of the switching device SCR101 during the negative half-wave of the AC power; and analyzing the received voltages to determine whether at least one fault exists in the leakage current detection circuit and the trip mechanism.

The switching device SCR101 is able to establish the voltage at the cathode of the switching device SCR101 when no fault exists in the trip mechanism of the leakage current detection device, during the positive half-wave of the AC power. The switching device SCR101 is able to establish the voltage at the gate of the switching device SCR101 when no fault exists in the leakage current detection circuit of the leakage current detection device, during the negative half-wave of the AC power. If the received voltage at the cathode of the switching device SCR101 is less than a predetermined threshold value, during the positive half-wave of the AC power, it is determined that at least one fault exists in the trip mechanism of the leakage current detection device. If the received voltage at the gate of the switching device SCR101 is less than a predetermined threshold value, during the negative half-wave of the AC power, it is determined that at least one fault exists in the leakage current detection circuit of the leakage current detection device.

In another embodiment, the method for intelligently testing the life of a leakage current protection device includes the step of providing a testing device, having a microcontroller unit (MCU); a power grid signal synchronization monitoring circuit; an alarm circuit; a power supply circuit; and a ground fault simulation unit, as described above. The method further includes the steps of generating a power grid synchronization signal that is received at the second input of the MCU, by the power grid signal synchronization monitoring circuit; producing a pulse signal when the power grid signal synchronization signal reduces to a first predetermined threshold value and a second signal during every positive half-wave of the AC power by the MCU, wherein the pulse signal is output to the gate of the switching device, and the second signal is output to the ground fault simulation unit so as to generate a simulated ground fault signal therein; and generating a third signal in responsive to the simulated ground fault signal, which is received at the third input of the MCU.

Moreover, the method includes the steps of received the pulse signal at the gate of the switching device to turn the switching device into a conductive state during the pulse period; detecting a DC voltage between the gate and the cathode of the switching device; and comparing the DC voltage to a second predetermined threshold value by the MCU to determine whether a fault exists in the leakage current protection device, wherein the MCU is programmed such that if the DC voltage is greater than the second predetermined threshold value, no fault exists in the leakage current protection device, and if the DC voltage is less than the second predetermined threshold value, a fault exists in the leakage current protection device.

Additionally, the method includes the steps of and activating the alarm circuit by the MCU if a fault exists in the leakage current protection device to generate an alarm to alert users of the leakage current protection device. In one embodiment, the activating the alarm circuit step further comprising at least of one of following steps activating an audio alarm circuit for generating an audible alarm; and activating a visual alarm circuit for generating a visible alarm.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. An apparatus for testing the life of a leakage current protection device, wherein the leakage current protection device has a first input, a second input, a third input, a fourth input, a first output, a second output, a third output, a trip switch having two LINE terminals that are electrically coupled to the first input and the second input, respectively, and two LOAD terminals that are electrically coupled to the inputs of an electrical appliance, respectively, a reset circuit having an input that is electrically coupled to the third input, and an output that is electrically coupled to the first output, a trip coil circuit having a switching device having a gate, an anode and a cathode, a first input electrically coupled to the output of the reset circuit and the first output, a second input that is electrically coupled to the fourth input, an output that is electrically coupled to the second output, and a leakage current detection circuit having an output that is electrically coupled to the third output of the leakage current protection device, comprising:
  (i) a microcontroller unit (MCU) having a first input that is electrically coupled to the second output of the leakage current protection device, a second input, a third input that is electrically coupled to the output of the leakage current detection device and the third output of the leakage current protection device, a first output that is electrically coupled to the third input of the leakage current protection device, a second output, a third output, a fourth output that is electrically coupled to the second input of the trip coil circuit and the fourth input of the leakage current protection device, and a power supply input P;
  (ii) a power grid signal synchronization monitoring circuit having an input that is electrically coupled to the first output of the leakage current protection device, and an output that is electrically coupled to the second input of the MCU;
  (iii) an alarm circuit having an input that is electrically coupled to the third output of the MCU, and a power supply input;
  (iv) a power supply circuit having an input that is electrically coupled to the first output of the leakage current protection device, and an output that is electrically coupled to the power supply input P of the MCU and the power supply input of the alarm circuit; and
  (v) a ground fault simulation unit having an input that is electrically coupled to the second output of the MCU, a first output that is electrically coupled to the first input of the leakage current protection device, a second output that is electrically coupled to the second input of the leakage current protection device,
wherein, in operation, the power grid signal synchronization monitoring circuit generates a first signal synchronized with an AC power from the first input and the second input of the leakage current protection device to form a power grid signal synchronization signal electrically coupled to the second input of the MCU; the MCU generates a pulse signal when the power grid signal synchronization signal reduces to a first predetermined threshold value during every positive half-wave of the AC power, and a second signal from the second output to the ground fault simulation unit to generate a simulated ground fault signal; the leakage current detection circuit generates a third signal in responsive to the simulated ground fault signal and the pulse signal, which is input into the third input of the MCU; the gate of the switching device receives the pulse signal to turn the switching device into its conductive state during the pulse period; and the MCU receives a DC voltage at the first input of the MCU, and compares the DC voltage with a second predetermined threshold value to determine whether a fault exists in the leakage current protection device, and activates the alarm circuit if the at least one fault exists.

2. The apparatus of claim 1, wherein the MCU is programmed such that if the DC voltage is greater than the second predetermined threshold value, no fault exists in the leakage current protection device, and if the DC voltage is less than the second predetermined threshold value, at least one fault exists in the leakage current protection device.

3. The apparatus of claim 2 provides a surge protection function, when the voltage at the first input and the second input of the leakage current protection device exceeds a third predetermined threshold value, the MCU sends a signal to a switching device to set the trip switch in a non-conductive state and to disconnect the AC power from the LINE terminals to the LOAD terminals of the trip switch.

4. The apparatus of claim 3 continues to detect faults of the leakage current protection device during the time period when the trip switch is in a non-conductive state.

5. The apparatus of claim 3, wherein the switching device comprises a silicon controlled rectifier, when the switching device is in a conductive state, the switching device passes current in the positive half-wave of the AC power to set the trip switch in a non-conductive state and to disconnect the AC power from the LINE terminals to the LOAD terminals of the trip switch.

6. The apparatus of claim 3 provides an automatic reset function, when the trip switch is in a non-conductive state for a predetermined timeout period, and the MCU does not detect any fault in the leakage current protection device, the MCU sends a signal to a reset switching device to set the trip switch in a conductive state and to connect the AC power from the LINE terminals to the LOAD terminals of the trip switch.

7. The apparatus of claim 6, wherein the length of the predetermined timeout period is adjustable.

8. The apparatus of claim 1, wherein the MCU sends an alarm signal to the alarm circuit when the MCU determines that at least one fault exists, and the alarm circuit receives the alarm signal and generates an alarm.

9. The apparatus of claim 8, wherein the alarm circuit comprises at least one of an audio alarm circuit for generating an audible alarm and a visual alarm circuit for generating a visible alarm.

10. A method for intelligently testing the life of a leakage current protection device, wherein the leakage current protection device has a first input, a second input, a third input, a fourth input, a first output, a second output, a third output, a trip switch having two LINE terminals that are electrically coupled to the first input and the second input, respectively, and two LOAD terminals that are electrically coupled to the inputs of an electrical appliance, respectively, a reset circuit having an input that is electrically coupled to the third input, and an output that is electrically coupled to the first output, a trip coil circuit having a switching device having a gate, an anode and a cathode, a first input electrically coupled to the output of the reset circuit and the first output, a second input that is electrically coupled to the fourth input, an output that is electrically coupled to the second output, and a leakage current detection circuit having an output that is electrically coupled to the third output of the leakage current protection device, comprising the steps of:
  (i) providing a testing device having:
    (a) a microcontroller unit (MCU) having a first input that is electrically coupled to the second output of the leakage current protection device, a second input, a third input that is electrically coupled to the output of the leakage current detection device and the third output of the leakage current protection device, a first output that is electrically coupled to the third input of the leakage current protection device, a second output, a third output, a fourth output that is electrically coupled to the second input of the trip coil circuit and the fourth input of the leakage current protection device, and a power supply input P;

(b) a power grid signal synchronization monitoring circuit having an input that is electrically coupled to the first output of the leakage current protection device, and an output that is electrically coupled to the second input of the MCU;

(c) an alarm circuit having an input that is electrically coupled to the third output of the MCU, and a power supply input;

(d) a power supply circuit having an input that is electrically coupled to the first output of the leakage current protection device, and an output that is electrically coupled to the power supply input P of the MCU and the power supply input of the alarm circuit; and (e) a ground fault simulation unit having an input that is electrically coupled to the second output of the MCU, a first output that is electrically coupled to the first input of the leakage current protection device, a second output that is electrically coupled to the second input of the leakage current protection device, (ii) generating a power grid synchronization signal that is received at the second input of the MCU, by the power grid signal synchronization monitoring circuit;

(iii) producing a pulse signal when the power grid signal synchronization signal reduces to a first predetermined threshold value and a second signal during every positive half-wave of the AC power by the MCU, wherein the pulse signal is output to the gate of the switching device, and wherein the second signal is output to the ground fault simulation unit so as to generate a simulated ground fault signal therein;

(iv) generating a third signal in responsive to the simulated ground fault signal, which is received at the third input of the MCU;

(v) received the pulse signal at the gate of the switching device to turn the switching device into a conductive state during the pulse period;

(vi) detecting a DC voltage between the gate and the cathode of the switching device;

(vii) comparing the DC voltage to a second predetermined threshold value by the MCU to determine whether a fault exists in the leakage current protection device, wherein the MCU is programmed such that if the DC voltage is greater than the second predetermined threshold value, no fault exists in the leakage current protection device, and if the DC voltage is less than the second predetermined threshold value, a fault exists in the leakage current protection device; and (viii) activating the alarm circuit by the MCU if a fault exists in the leakage current protection device to generate an alarm to alert users of the leakage current protection device.

11. The method of claim 10, wherein the step of activating the alarm circuit comprises at least of one of following steps:
(i) activating an audio alarm circuit for generating an audible alarm; and
(ii) activating a visual alarm circuit for generating a visible alarm.

12. A leakage current protection device with intelligent life testing, comprising:

(i) a leakage current protection device having:
(A) a first input;
(B) a second input;
(C) a third input;
(D) a fourth input;
(E) a first output;
(F) a second output;
(G) a third output;
(H) a trip switch having two LINE terminals that are electrically coupled to the first input and the second input, respectively, and two LOAD terminals that are electrically coupled to the inputs of an electrical appliance, respectively;
(I) a reset circuit having an input that is electrically coupled to the third input, and an output that is electrically coupled to the first output;
(J) a trip coil circuit having a switching device that has a gate, a anode and a cathode, a first input that is electrically coupled to the output of the reset circuit and the first output, and a second input that is electrically coupled to the fourth input, and an output that is electrically coupled to the second output; and
(K) a leakage current detection circuit having a output that is electrically coupled to the third input of the MCU, (ii) a microcontroller unit (MCU) having a first input that is electrically coupled to the second output of the leakage current protection device, a second input, a third input that is electrically coupled to the output of the leakage current detection device and the third output of the leakage current protection device, a first output that is electrically coupled to the third input of the leakage current protection device, a second output, a third output, a fourth output that is electrically coupled to the second input of the trip coil circuit and the fourth input of the leakage current protection device, and a power supply input P;

(iii) a power grid signal synchronization monitoring circuit having an input that is electrically coupled to the first output of the leakage current protection device, and an output that is electrically coupled to the second input of the MCU;

(iv) an alarm circuit having an input that is electrically coupled to the third output of the MCU, and a power supply input;

(v) a power supply circuit having an input that is electrically coupled to the first output of the leakage current protection device, and an output that is electrically coupled to the power supply input P of the MCU and the power supply input of the alarm circuit; and (vi) a ground fault simulation unit having an input that is electrically coupled to the second output of the MCU, a first output that is electrically coupled to the first input of the leakage current protection device, a second output that is electrically coupled to the second input of the leakage current protection device, wherein, in operation, the power grid signal synchronization monitoring circuit generates a first signal synchronized with an AC power from the first input and the second input of the leakage current protection device to form a power grid signal synchronization signal electrically coupled to the second input of the MCU; the MCU generates a pulse signal when the power grid signal synchronization signal reduces to a first predetermined threshold value during every positive half-wave of the AC power, and a second signal from the second output to the ground fault simulation unit to generate a simulated ground fault signal; the leakage current detection circuit generates a third signal in responsive to the simulated ground fault signal and the pulse signal, which is input into the third input of the MCU; the gate of the switching device receives the pulse signal to turn the switching device into its conductive state during the pulse period; and the MCU receives a DC voltage at the first input of the MCU, and compares the DC voltage with a second predetermined threshold value to determine whether a fault exists in the leakage current protection device, and activates the alarm circuit if the at least one fault exists.

13. The leakage current protection device of claim 12, wherein the MCU is programmed such that if the DC voltage is greater than the second predetermined threshold value, no fault exists in the leakage current protection device, and if the DC voltage is less than the second predetermined threshold value, at least one fault exists in the leakage current protection device.

14. The leakage current protection device of claim 13 provides a surge protection function, when the voltage at the first input and the second input of the leakage current protection device exceeds a third predetermined threshold value, the MCU sends a signal to a switching device to set the trip switch in a non-conductive state and to disconnect the AC power from the LINE terminal to the LOAD terminal of the trip switch.

15. The leakage current protection device of claim 14 continues to detect faults of the leakage current protection device during the time period when the trip switch is in a non-conductive state.

16. The leakage current protection device of claim 14, wherein the switching device comprises a silicon controlled rectifier, when the switching device is in a conductive state, the switching device passes current in the positive half-wave of the AC power to set the trip switch in a non-conductive state and to disconnect the AC power from the LINE terminal to the LOAD terminal of the trip switch.

17. The leakage current protection device of claim 14 provides an automatic reset function, when the trip switch is in a non-conductive state for a predetermined timeout period, and the MCU does not detect any fault in the leakage current protection device, the MCU sends a signal to a reset switching device to set the trip switch in a conductive state and to connect the AC power from the LINE terminal to the LOAD terminal of the trip switch.

18. The leakage current protection device of claim 17, wherein the length of the predetermined timeout period is adjustable.

19. The leakage current protection device of claim 12, wherein the MCU sends an alarm signal to the alarm circuit when the MCU determines that at least one fault exists, and the alarm circuit receives the alarm signal and generates an alarm.

20. The leakage current protection device of claim 19, wherein the alarm circuit comprises at least one of an audio alarm circuit for generating an audible alarm and a visual alarm circuit for generating a visible alarm.

* * * * *